United States Patent
Choi et al.

(10) Patent No.: US 11,622,230 B2
(45) Date of Patent: Apr. 4, 2023

(54) METHOD AND APPARATUS FOR MOTION-BASED VEHICLE RANGING

(71) Applicant: QUALCOMM Incorporated, San Diego, CA (US)

(72) Inventors: Chang-Sik Choi, Hillsborough, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 16/901,915

(22) Filed: Jun. 15, 2020

(65) Prior Publication Data
US 2021/0392454 A1 Dec. 16, 2021

(51) Int. Cl.
*H04W 24/00* (2009.01)
*H04W 4/02* (2018.01)
(Continued)

(52) U.S. Cl.
CPC ............ *H04W 4/023* (2013.01); *B60W 40/06* (2013.01); *B60W 40/105* (2013.01); *B60W 40/107* (2013.01); *H04W 4/027* (2013.01); *H04W 4/40* (2018.02); *B60W 2520/10* (2013.01); *B60W 2552/00* (2020.02); *B60W 2556/45* (2020.02)

(58) Field of Classification Search
CPC ....... H04W 4/023; H04W 4/40; H04W 4/027; B60W 40/06; B60W 40/105; B60W 40/107; B60W 2552/00; B60W 2556/45; B60W 2520/10
See application file for complete search history.

(56) References Cited

U.S. PATENT DOCUMENTS

| 2009/0167513 A1* | 7/2009 | Hill ...................... G01S 5/0289 370/328 |
| 2015/0120336 A1* | 4/2015 | Grokop ................. G06Q 40/08 705/4 |

(Continued)

FOREIGN PATENT DOCUMENTS

| WO | 2019036578 A1 | 2/2019 |
| WO | 2020026211 A1 | 2/2020 |
| WO | 2020091545 A1 | 5/2020 |

OTHER PUBLICATIONS

International Search Report and Written Opinion—PCT/US2021/032247—ISA/EPO—dated Aug. 25, 2021.

*Primary Examiner* — Erika A Washington
(74) *Attorney, Agent, or Firm* — Thien T. Nguyen

(57) ABSTRACT

A user equipment in a vehicle (V-UE) may transmit ranging signals, for example positioning reference signals (PRS), via inter-vehicle messages. The broadcast parameters for the ranging signals, such as the timing of transmission, the bandwidth, or a combination thereof, may be adjusted based on one or more motion characteristics of the vehicle. If high speed or large acceleration, or rate of turning, is detected, the rate of transmission and/or the resource blocks included in the ranging signals may be increased. By increasing the rate of transmission and/or recourse blocks in the ranging signals, other vehicles receiving the ranging signals may update the range more often and with greater accuracy for increased safety while the transmitting vehicle is traveling at high speeds or acceleration.

28 Claims, 9 Drawing Sheets

(51) Int. Cl.
  *H04W 4/40*  (2018.01)
  *B60W 40/06*  (2012.01)
  *B60W 40/105*  (2012.01)
  *B60W 40/107*  (2012.01)

(56) References Cited

U.S. PATENT DOCUMENTS

| | | | |
|---|---|---|---|
| 2017/0127246 A1* | 5/2017 | Zou | H04W 4/46 |
| 2019/0208387 A1* | 7/2019 | Jiang | H04W 72/044 |
| 2019/0221110 A1* | 7/2019 | Vanderveen | G01S 13/74 |
| 2020/0128506 A1* | 4/2020 | Zhang | H04W 4/08 |
| 2020/0196321 A1* | 6/2020 | Zhang | G08G 1/161 |
| 2021/0029507 A1* | 1/2021 | Khoryaev | H04L 5/0069 |
| 2021/0297216 A1* | 9/2021 | Shreevastav | G01S 1/20 |

\* cited by examiner

METHOD AND APPARATUS FOR MOTION-BASED VEHICLE RANGING

BACKGROUND

Background Field

The subject matter disclosed herein relates to wireless communications systems, and more particularly to methods and apparatuses for vehicle ranging in a wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

Coordinated or automated driving requires communications between vehicles, which may be direct or indirect, e.g., via an infrastructure component such as a roadside unit (RSU). For vehicle safety applications, vehicle user equipments (UEs) broadcast ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Traffic conditions, including the locations of nearby vehicles, however, may quickly vary in an unpredictable manner, e.g., if nearby vehicles abruptly accelerate or decelerate or make some sudden changes in direction of travel. Vehicle ranging procedures should accommodate sudden changes in vehicle motion to ensure safe vehicle operation.

SUMMARY

A user equipment in a vehicle (V-UE) may transmit ranging signals, for example positioning reference signals (PRS), via inter-vehicle messages. The broadcast parameters for the ranging signals, such as the timing of transmission, the bandwidth, or a combination thereof, may be adjusted based on one or more motion characteristics of the vehicle. If high speed or large acceleration, or rate of turning, is detected, the rate of transmission and/or the resource blocks included in the ranging signals may be increased. By increasing the rate of transmission and/or recourse blocks in the ranging signals, other vehicles receiving the ranging signals may update the range more often and with greater accuracy for increased safety while the transmitting vehicle is traveling at high speeds or acceleration.

In one implementation, a method of ranging between vehicles performed by a device in a vehicle, includes detecting one or more motion characteristics of the vehicle, the one or more motion characteristics comprising at least one of speed, velocity, acceleration, deceleration, and turning; adjusting at least one of timing of transmission, bandwidth, or combination thereof for a ranging signal to be broadcast based on the detected one or more motion characteristics; and broadcasting the ranging signal with adjusted timing of transmission, bandwidth, or combination thereof.

In one implementation, a wireless device in a vehicle configured to support ranging between vehicles, includes a wireless transceiver configured to communicate in the wireless network; at least one memory; at least one processor coupled to the wireless transceiver and the at least one memory, wherein the at least one processor is configured to: detect one or more motion characteristics of the vehicle, the one or more motion characteristics comprising at least one of speed, velocity, acceleration, deceleration, and turning; adjust at least one of timing of transmission, bandwidth, or combination thereof for a ranging signal to be broadcast based on the detected one or more motion characteristics; and broadcast the ranging signal, via the wireless transceiver, with adjusted timing of transmission, bandwidth, or combination thereof.

In one implementation, a wireless device in a vehicle configured to support ranging between vehicles, includes means for detecting one or more motion characteristics of the vehicle, the one or more motion characteristics comprising at least one of speed, velocity, acceleration, deceleration, and turning; means for adjusting at least one of timing of transmission, bandwidth, or combination thereof for a ranging signal to be broadcast based on the detected one or more motion characteristics; and means for broadcasting the ranging signal with adjusted timing of transmission, bandwidth, or combination thereof.

In one implementation, a non-transitory storage medium including program code stored thereon, the program code is operable to configure at least one processor in a wireless device in a vehicle configured to support ranging between vehicles includes program code to detect one or more motion characteristics of the vehicle, the one or more motion characteristics comprising at least one of speed, velocity, acceleration, deceleration, and turning; program code to adjust at least one of timing of transmission, bandwidth, or combination thereof for a ranging signal to be broadcast based on the detected one or more motion characteristics; and program code to broadcast the ranging signal with adjusted timing of transmission, bandwidth, or combination thereof.

In one implementation, a method of ranging between vehicles performed by an entity in a wireless communication system, includes receiving a request from a device in a vehicle to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning; determining an adjustment to the at least one of timing of transmission, bandwidth, or combination thereof for the ranging signal; and transmitting instructions to the device in the vehicle to adjust the at least one of the timing of transmission, bandwidth, or combination thereof for the ranging signal to be broadcast by the device in the vehicle.

In one implementation, an entity in a wireless communication system configured to support ranging between vehicles in the wireless communication system, includes an external interface configured to communicate in the wireless network; at least one memory; at least one processor coupled to the external interface and the at least one memory, wherein the at least one processor is configured to: receive a request from a device in a vehicle, via the external interface, to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning; determine an adjustment to the at least one of timing of transmission, bandwidth, or combination thereof for the ranging signal; and transmit instructions to the device in the vehicle, via the external interface, to adjust the at least one of the timing of transmission, bandwidth, or combination thereof for the ranging signal to be broadcast by the device in the vehicle.

In one implementation, an entity in a wireless communication system configured to support ranging between vehicles in the wireless communication system includes means for receiving a request from a device in a vehicle to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning; means for determining an adjustment to the at least one of timing of transmission, bandwidth, or combination thereof for the ranging signal; and means for transmitting instructions to the device in the vehicle to adjust the at least one of the timing of transmission, bandwidth, or combination thereof for the ranging signal to be broadcast by the device in the vehicle.

In one implementation, a non-transitory storage medium including program code stored thereon, the program code is operable to configure at least one processor in an entity in a wireless communication system configured to support ranging between vehicles in the wireless communication system includes program code to receiving a request from a device in a vehicle to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning; program code to determining an adjustment to the at least one of timing of transmission, bandwidth, or combination thereof for the ranging signal; and program code to transmitting instructions to the device in the vehicle to adjust the at least one of the timing of transmission, bandwidth, or combination thereof for the ranging signal to be broadcast by the device in the vehicle.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
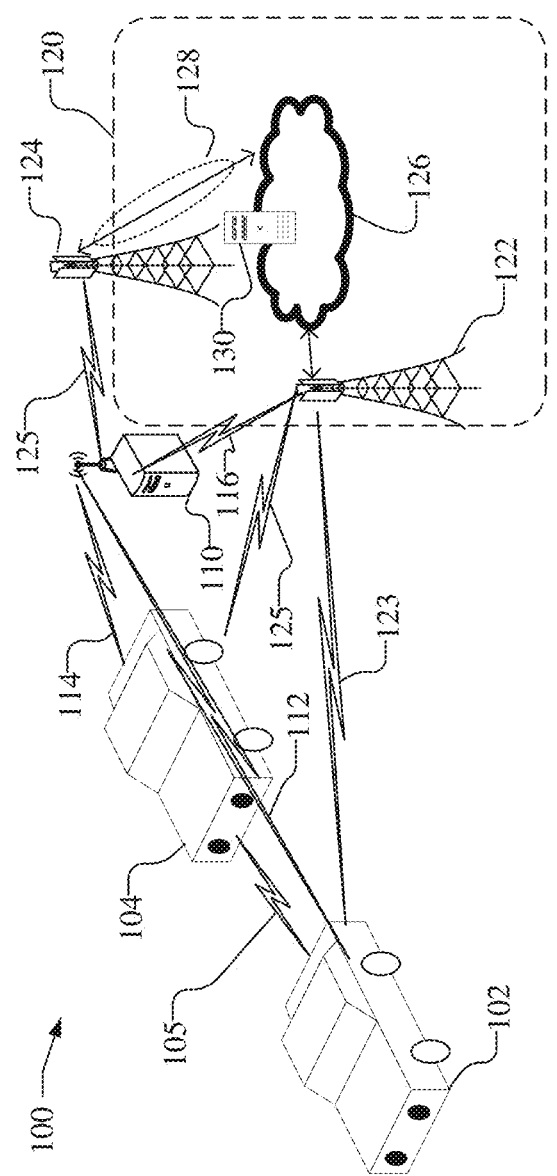
FIG. 1 illustrates a wireless communication system illustrating inter-vehicle communications including adjustably broadcasting ranging signals based on motion characteristics of a vehicle.

Inter-vehicle communications may be used, for example, for automated driving and vehicle safety applications. Inter-vehicle communications may be direct, e.g., vehicle to vehicle, or may be indirect, e.g., via an infrastructure component such as a roadside unit (RSU). The inter-vehicle communications may include messaged and information elements (IEs) with which a vehicle may provide information necessary for automated driving For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure using direct communication systems, such as dedicated short-range communication (DSRC), cellular Vehicle-to-Everything (C-V2X) communication, and even 5G New Radio (NR) communications. PRS signals, are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OTDOA).

In general, for PRS-based positioning, all vehicles are po to broadcast PRS so that all other vehicles may receive the broadcast PRS and determine the range to the broadcasting vehicle. The PRS may be broadcast in an unlicensed or licensed spectrum. The transmission of the PRS may be periodic or event-triggered. Additionally, vehicles broadcasting and receiving PRS may be required to be synchronized. As all vehicles are required to broadcast PRS, there may be a large number of PRS being broadcast at any one time producing a large overhead.

The PRS broadcast parameters, such as timing of transmissions and bandwidth, may be configured based on average driving conditions. However, driving conditions, including the manner in which nearby vehicles operate, may quickly vary in an unexpected manner. For example, nearby vehicles may suddenly change speed or direction. In such conditions, PRS broadcast with consistent timing and bandwidth parameters may be inadequate for vehicles to determine relative locations of other vehicles and to continue safe operation.

Accordingly, it is desirable to adjust the timing of transmission and/or bandwidth of PRS based on the motion or one or more motion characteristics of a vehicle for more accurate ranging and positioning. For example, based on motion characteristics of a vehicle, e.g., speed, acceleration, deceleration, or rate of turning that exceeds a predetermined threshold, a V-UE may adjust the PRS broadcast parameters to broadcast the PRS more frequently and/or to increase the bandwidth of the PRS transmission. The predetermined threshold used to detect high speed or large accelerations may be varied based on factors, such as the geography or road conditions, the initial speed of the vehicle, etc.

FIG. 1 illustrates a wireless communication system 100 illustrating inter-vehicle communications, including adjustably broadcasting ranging signals based on motion characteristics of a vehicle, as described herein. Wireless communication system 100 illustrates a first vehicle 102 with a first wireless device, e.g., V-UE 102, in wireless communications with another V-UE 104, illustrated as a second vehicle. The V-UE 102 and V-UE104 may comprise, but are not limited to, an on board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104. The first vehicle 102 and second vehicle 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as ADAS, which helps drivers with critical decisions, such as lane changes, speed changes, overtaking speeds, and may be used to assist in parking as discussed herein. Low latency communications are used in V2X and, are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities when the V2X entities. The other mode of operation uses network based wireless communication between entities. The two modes of operation may be combined, or other modes of operation may be used if desired.

As illustrated in FIG. 1, the wireless communication system 100 may operate using direct or indirect wireless communications between the vehicle 102 and vehicle 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, vehicle 102 and vehicle 104 may directly communicate using with a Vehicle-to-Vehicle (V2V) communication link 105.

In other implementations, vehicle 102 and vehicle 104 may indirectly communicate, e.g., through a roadside unit (RSU) 110 via Vehicle-to-Infrastructure (V2I) communication links 112 and 114, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The vehicles 102, 104 and RSU 106 may communicate with additional entities, such as additional vehicles, RSUs or pedestrians (not shown) using direct or indirect communication links. The RSU 110 may be capable of determining relative ranges of vehicles 102 and 104 using PRS broadcast by the vehicles 102 and 104.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases.

Additionally, as illustrated in FIG. 1, the wireless communication system 100 may operate using indirect wireless communications, e.g., using cellular vehicle-to-everything (CV2X). For example, vehicles may communicate via a base station 122 in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access. Thus, as illustrated, the vehicles 102 and 104 may wirelessly communicate with a base station 122 in the network infrastructure 120, via communication links 123 and 125. In some implementations, the base station 122 may directly communicate with the RSU 110 via communication link 116. The base station 122 may also communicate with other base stations 124 through the IP layer 126 and network 128, such as an Evolved Multimedia Broadcast Multicast Services (eM-BMS)/Single Cell Point To Multipoint (SC-PTM) network. A V2X application server 130 may be part of or connected to the IP layer 126 and may receive and route information between the V2X entities as well as receive other external inputs. The base station 124 may wirelessly communicate with the other V2X entities, such as the RSU 110 via communication link 127 or vehicles 102 and 104 via communication links (not shown).

Vehicles 102 and 104 may broadcast PRS on links 105, 112, 114, 123 or 125, with which the range or relative positions between vehicles 102 and 104 may be determined. The PRS broadcast by vehicles 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcast on unlicensed spectrum, listen before transmit (LBT) protocols may be employed.

For example, where vehicles 102 and 104 broadcast PRS in a V2V link 105, the range or relative positions between vehicles 102 and 104 may be determined directly, e.g., using one way ranging, RTT, or other appropriate ranging techniques. On the other hand, where vehicles 102 and 104 broadcast PRS in V2I links 112 and 114 or via links 123 and 125, the range or relative positions between vehicles 102 and 104 may be determined indirectly based on the range or relative positions between vehicle 102 and RSU 110 (or base station 122) and the range or relative positions between vehicle 104 and RSU 110 (or base station 122), which may be determined using one way ranging, RTT, or other appropriate positioning techniques.

The V2V communications based on direct wireless communications between the vehicles 102 and 104, do not require any network infrastructure and enable low latency communications, which is advantageous for precise ranging or positioning. Accordingly, such direct wireless V2V communications may be desirable for ranging over short distances, e.g., with nearby vehicles, whereas ranging with vehicles over extended distances have more relaxed latency requirements, and therefore may be able to utilize the vehicle to vehicle signaling via V2V link 105 as well as the vehicle to infrastructure signaling via links 112 and 114 or via links 123 and 125.

Figure 2:
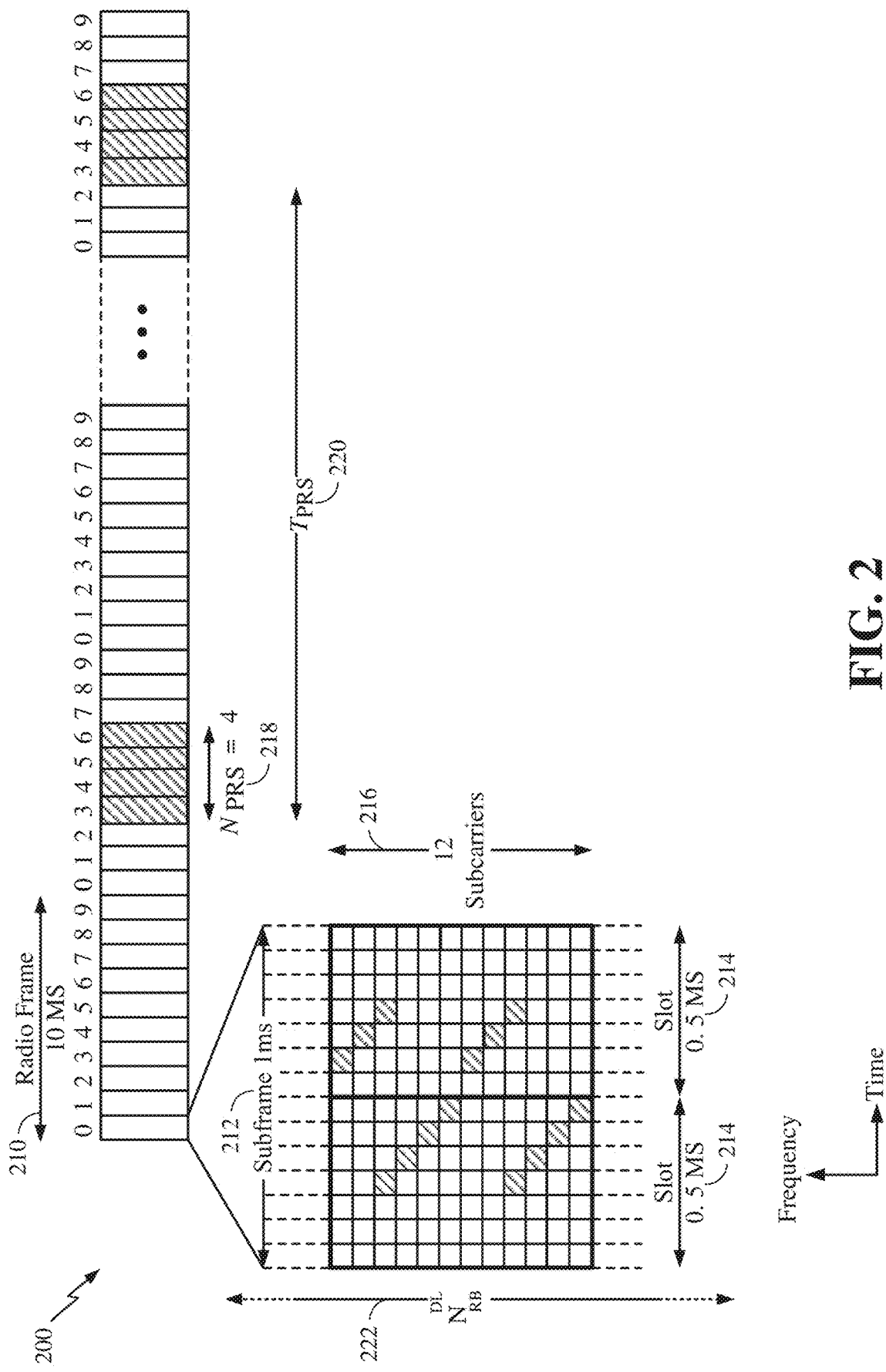
FIG. 2 is a diagram of a structure of an example LTE subframe sequence with Positioning Reference Signaling (PRS) positioning occasions.

FIG. 2 shows a structure of an example subframe sequence 200 with PRS positioning occasions. Subframe sequence 200 may be applicable to broadcast PRS signals from V-UEs 102 and 104 in wireless communication systems 100. While FIG. 2 provides an example of a subframe sequence for Long Term Evolution (LTE) under The 3rd Generation Partnership Project (3GPP), similar subframe sequence implementations may be realized for other communication technologies/protocols, including V2X.

In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink Radio Frames 210 may be of 10 ms duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

In the wireless communication system 100 illustrated in FIG. 1, a V-UE 102 in sidelink communication with another V-UE 104, may transmit frames, or other physical layer signaling sequences, supporting PRS signals (i.e. a sidelink PRS) according to frame configurations either similar to, or the same as that, shown in FIG. 2 and (as described later) in FIG. 3, which may be measured and used for vehicle ranging. As noted, other types of wireless nodes (e.g., RSU 110) and base stations 122, 124, may also be configured to transmit or receive PRS signals configured in a manner similar to (or the same as) that depicted in FIGS. 2 and 3. Since transmission of a PRS by a wireless node or base station is directed to all V-UEs within radio range, a wireless node or base station can also be considered to transmit (or broadcast) a PRS.

A PRS, which has been defined in Third Generation Partnership Project (3GPP) LTE Release-9 and later releases, may be transmitted by wireless nodes (e.g., base stations) after appropriate configuration (e.g., by an Operations and Maintenance (O&M) server). A PRS may be transmitted in special positioning subframes that are grouped into positioning occasions. PRS occasions may be grouped into one or more PRS occasion groups. For example, in LTE, a PRS positioning occasion can comprise a number $N_{PRS}$ of consecutive positioning subframes where the number $N_{PRS}$ may be between 1 and 160 (e.g., may include the values 1, 2, 4 and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ equals 4218 and $T_{PRS}$ is greater than or equal to 20220. In some aspects, $T_{PRS}$ may be measured in terms of the number of subframes between the start of consecutive positioning occasions.

Figure 3:
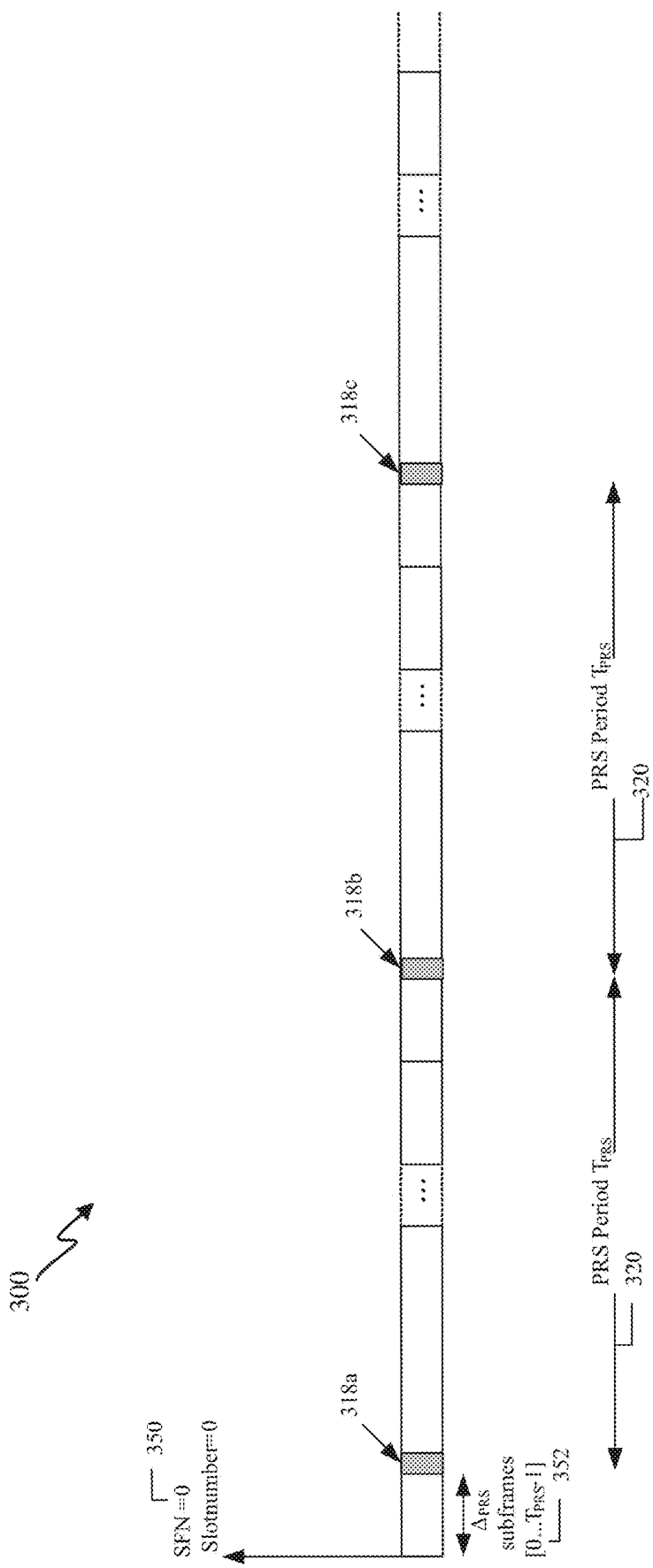
FIG. 3 is a diagram illustrating further aspects of PRS transmission for a cell supported by a wireless node.

FIG. 3 illustrates an exemplary PRS configuration 300 for a cell supported by a wireless node (such as a base station). Again, PRS transmission for LTE is assumed in FIG. 3, although the same or similar aspects of PRS transmission to those shown in and described for FIG. 3 may apply to sidelink transmission between V-UEs 102, 104 in V2X, and/or other wireless technologies. FIG. 3 shows how PRS positioning occasions are determined by a System Frame Number (SFN), a cell specific subframe offset ($\Delta_{PRS}$) 352, and the PRS Periodicity ($T_{PRS}$) 320. Typically, the cell specific PRS subframe configuration is defined by a "PRS Configuration Index" $I_{PRS}$ included in the OTDOA assistance data. The PRS Periodicity ($T_{PRS}$) 320 and the cell specific subframe offset (APRs) are defined based on the PRS Configuration Index $I_{PRS}$, in 3GPP TS 36.211 entitled "Physical channels and modulation." A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 320, and APRs is the cell-specific subframe offset 352.

As shown in FIG. 3, the cell specific subframe offset APRs 352 may be defined in terms of the number of subframes transmitted starting from System Frame Number 0 (Slot 'Number 0', marked as slot 350) to the start of the first (subsequent) PRS positioning occasion. In the example in FIG. 3, the number of consecutive positioning subframes ($N_{PRS}$) in each of the consecutive PRS positioning occasions 318a, 318b, and 318c equals 4.

Typically, PRS occasions from all cells in a network that use the same frequency are aligned in time and may have a fixed known time offset (e.g., cell-specific subframe offset 352) relative to other cells in the network that use a different frequency. In SFN-synchronous networks all wireless nodes (e.g., base stations) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

As defined by 3GPP (e.g., in 3GPP TS 36.211), for LTE systems, the sequence of subframes used to transmit PRS (e.g., for OTDOA positioning) may be characterized and defined by a number of parameters, as described previously, comprising: (i) a reserved block of bandwidth (BW), (ii) the configuration index $I_{PRS}$, (iii) the duration $N_{PRS}$, (iv) an optional muting pattern; and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of LPP according to 3GPP TS 36.355. A directional PRS may be configured as just described according to 3GPP TSs and may, for example, use a low PRS duty cycle (e.g., $N_{PRS}=1$, $T_{PRS}=160$ subframes) or a high duty cycle.

As noted above, the subframe sequence 200 with PRS positioning occasions and PRS configuration 300 shown in FIGS. 2 and 3 are specific for LTE. Nevertheless, similar subframe sequence and PRS configurations may be used for V2X, e.g., with appropriate changes. For example, in some implementations, for V2X, PRS candidate slots may be every 100 msec and may spans 100 RB over a 20 MHz bandwidth.

The relative locations between vehicles may be determined as a range between vehicles based on PRS. For example, a V-UE 102 may broadcast PRS, and may further transmit the time of transmission of the PRS, e.g., in an ITS message. The receiving V-UE 104 receives the PRS and uses the time of reception, as measured at V-UE 104 along with the time of transmission as provided by the V-UE 102 to determine the time of flight of the PRS. The V-UE 104 may determine the distance or range between the vehicles based on the time of flight and the speed of light. Other ranging techniques, such as RTT may be used if desired.

Figure 4A:
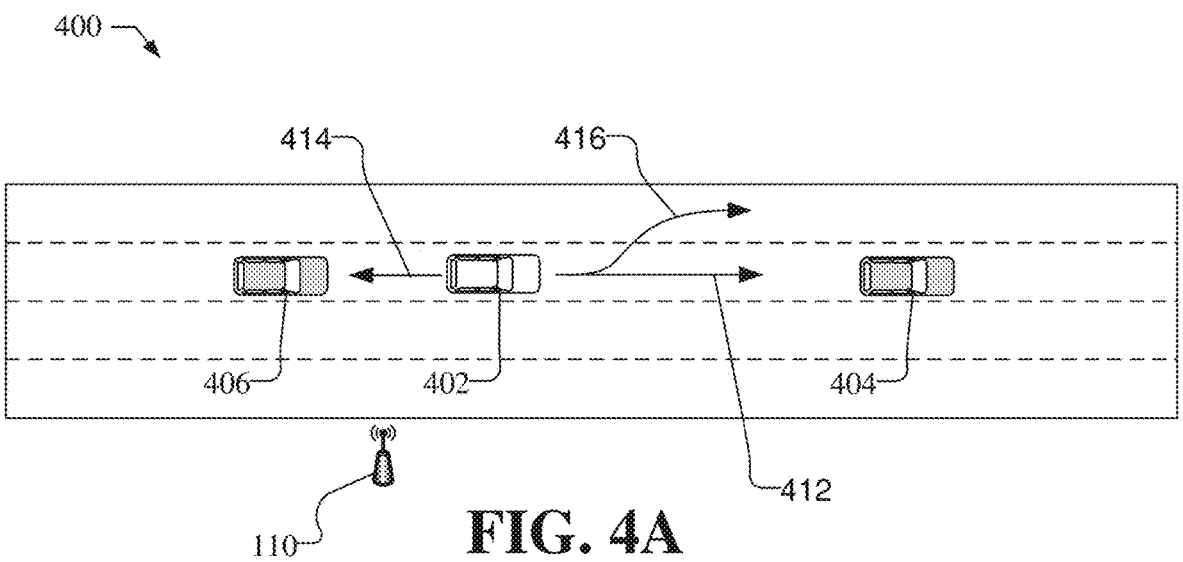
FIGS. 4A and 4B illustrate environment in which vehicles are traveling roads and broadcast parameters of ranging signals may be adjusted based on motion characteristics of a vehicle.
Figure 4B:
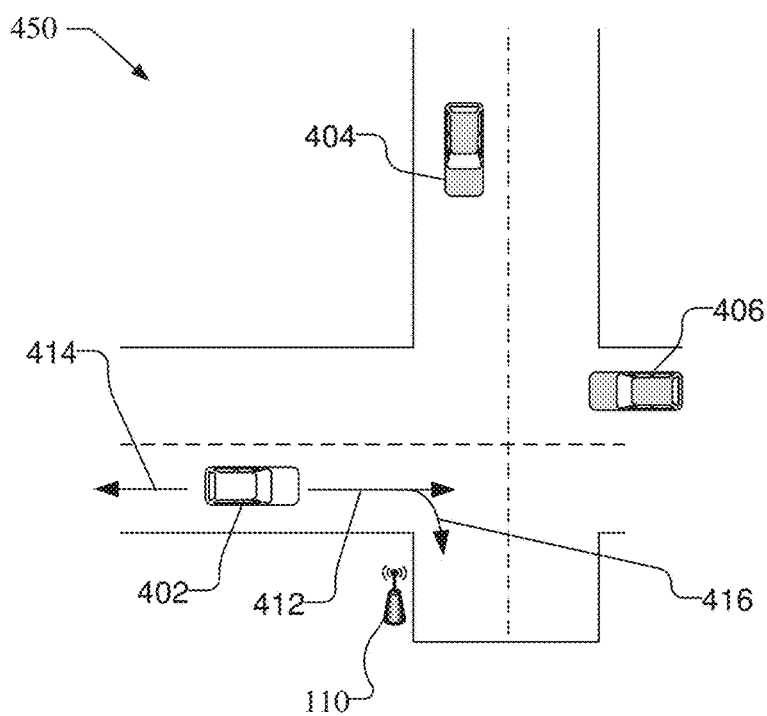

FIGS. 4A and 4B illustrates environments 400 and 450 in which a number of vehicles 402, 404, and 406 are traveling along the same roads. An RSU 110 may be present as illustrated. FIG. 4A, for example, illustrates an environment 400 in which the vehicles 402, 404, and 406 are traveling together at the same or nearly the same speeds in the same direction on a road, which may be a highway, street, etc. FIG. 4B, for example, illustrates an environment 450 in which the vehicles 402, 404, and 406 are traveling in different directions on the same or intersecting roads. It should be understood that FIGS. 4A and 4B merely illustrate two possible environments and conditions and that, of course, vehicles may be located in many different types of environment conditions.

As indicated by arrows 412, 414, or 416, in both FIGS. 4A and 4B, vehicle 402 may abruptly alter its motion. For example, vehicle 402 may alter its motion through acceleration, illustrated by arrow 412, or deceleration, illustrated by arrow 414, or turning, e.g., changing lanes, illustrated by arrow 416. If any of these types of changes in motion of vehicle 402 is large, i.e., a large acceleration, deceleration, or rate of turning, the distance between vehicles 402 and vehicles 404 and 406 may change quickly in an unexpected manner for vehicles 404 and 406, which may be unsafe. Additionally, vehicle 402 may be traveling at a constant speed that is high, e.g., significantly greater than the speed limit. When a large acceleration or high speed is detected by vehicle 402, vehicle 402 may alter the timing and/or bandwidth of the PRS that it broadcasts. For example, the vehicle 402 may increase the number of PRS that are broadcast, e.g., decrease the broadcast period, so that the other vehicles 404 and 406 may more frequently update the range to vehicle 402. The vehicle 402 may additionally or alternatively increase the bandwidth of the PRS broadcast so that the other vehicles 404 and 406 may determine the range to vehicle 402 more accurately.

The vehicle 402, i.e., the V-UE in vehicle 402, may detect one or more motion characteristics by accessing on-board speed sensors. For example, the speed of the vehicle 402 may be determined from the vehicle speed sensor. Acceleration may be determined based on the change in speed over a time interval, e.g., a speed difference between sensor updates, divided by the sensor update period, or from an accelerometer on the vehicle 402 or the V-UE. The V-UE may be able to access the motion data through a controller area network (CAN) network or on board computer. Acceleration and deceleration are determined in the same manner, where deceleration refers to acceleration in a direction opposite to the direction of velocity, i.e., a reduction in speed. Depending on the make and year of a vehicle, acceleration information for the vehicle may also be available. In some implementations, the V-UE may include an accelerometer, which may be useful to determine acceleration or deceleration as well as the rate of turning.

In one implementation, the application layer of the V-UE, which may control event-triggered PRS signaling, may monitor the speed and/or acceleration of the vehicle based on the on-board speed and/or acceleration sensor. The acceleration, deceleration, or rate of turning (sometimes collectively referred to simply as acceleration) and/or speed of the vehicle may be compared to predetermined thresholds. When the speed, acceleration, or combination thereof is greater than a corresponding predetermined threshold, the V-UE, e.g., the application layer and/or the corresponding Radio Resource Control configuration, may trigger additional PRS signaling within a unit time, e.g., a decrease in the period of PRS signaling. Additionally, or alternatively, the V-UE may broadcast the PRS signal in a wider spectrum. The adjustment of the PRS broadcast may persist as long as the detected one or more motion characteristics continues, e.g., while speed or acceleration are greater than the corresponding thresholds. In some implementations, the adjustment of the PRS broadcast may persist for some period after the abrupt motion change is no longer detected.

In some implementations, the predetermined threshold used to trigger an adjustment to the PRS broadcast may vary based on external factors, such as the geography or road conditions. Different predetermined thresholds may be stored and selected for use based on the type of road the vehicle 402 is on. For example, the predetermined thresholds used may be lower for a winding road compared to a straight road or for an on-ramp to a highway compared to a residential road. Similarly, the predetermined thresholds used may be lower in dry conditions compared to wet or icy conditions, or for environments with a high density of nearby vehicles compared to a low density of nearby vehicles. Moreover, in some implementations, a combination of factors, such as speed and acceleration may be used to trigger an adjustment to the PRS broadcast. For example, in highway scenarios, a combined measurement based on vehicle speed and acceleration may be used to trigger an adjustment of the PRS broadcast. By way of example, an adjustment of the PRS broadcast may be triggered based on the amount of change in speed (acceleration) normalized by speed exceeding a predetermined threshold, e.g., if abs (acceleration)/abs(speed)>threshold. Moreover, in some implementations, the adjustment to the PRS broadcast may be based on factors other than acceleration, such as speed. For example, if a vehicle is traveling at a speed that is significantly greater (i.e., more than a predetermined threshold) than a posted speed limit for a road, the PRS broadcast may be similarly adjusted. The predetermined thresholds may be stored in the V-UE or may be provided to the V-UE, e.g., by a central server 130. Moreover, the geography or road conditions may be supplied to the V-UE, e.g., by the same or a different server.

In one implementation, the vehicle 402 may adjust the timing of PRS transmissions based on detected motion characteristics. The application layer of the V-UE, for example, may have a pre-determined period for PRS signaling used for normal driving, i.e., when high speed or large accelerations are not detected. By way of example, PRS may be broadcast by the V-UE every 1000 msec and may span 50 RB over a 20 MHz bandwidth during normal driving. The periodic PRS signaling may be overridden by the application layer when a large acceleration or high speed, or combination thereof is detected, e.g., the speed or acceleration exceeds a predetermined threshold. Once high speed or large acceleration is detected, the transmission timing of the broadcast PRS may be adjusted by the application layer of the V-UE. The V-UE may schedule additional PRS or may change the period of the PRS broadcast. By way of example, the timing of the PRS broadcast may be adjusted from broadcasting PRS every 1000 msec to broadcasting PRS every 200 msec, but of course other rates may be used if desired. By increasing the transmission rate of PRS from the accelerating (or speeding) vehicle, nearby vehicles that receive the PRS may determine the relative positions of the vehicles at a corresponding increased rate, thereby improving safety.

In implementations where the PRS is broadcast on an unlicensed spectrum in a decentralized fashion, the number of resource blocks may be affected by factors, such as the LBT procedure, the number of nearby concurrent PRS, or potential PRS sources, i.e., nearby V-UEs. During normal operation, e.g., when no high speed or acceleration is detected, a V-UE broadcast PRS with a pre-defined regular duty cycle with duration N. Once high speed or acceleration is detected, the V-UE may adjust the broadcast PRS to a different pre-defined short duty cycle with duration M, where M is strictly less than N. For instance, if the estimated number of vehicles around the V-UE is K, the duration M may be M=N/K.

In one implementation, the vehicle 402 may adjust the bandwidth of the PRS transmissions based on detected motion characteristics. For example, the application layer of the V-UE may schedule the periodic PRS signaling to occupy a predetermined number of frequency resources for normal driving, i.e., when high speed or large accelerations are not detected. For example, as discussed above, PRS may be broadcast by the V-UE every 1000 msec and may span 50 RB over a 20 MHz bandwidth during normal driving. When a large acceleration or high speed is detected, the PRS may be scheduled by the application layer (or corresponding RRC configuration) to occupy a larger bandwidth, e.g., by way of example, spanning 100 RB over the 20 MHz bandwidth, but of course other bandwidths may be used if desired. The accuracy of the determined range between vehicles using PRS is affected by the frequency spectrum of the broadcast PRS. A PRS with a larger bandwidth produces more accurate ranging. Accordingly, by increasing the bandwidth of PRS broadcast from the accelerating (or speeding) vehicle, nearby vehicles that receive the PRS may determine the relative positions of the vehicles with increased accuracy, thereby improving safety.

In some implementations, both the timing of transmissions and the bandwidth of the PRS signaling may be altered, e.g., the PRS may be altered from every 1000 msec, spanning 50 RB to every 200 msec and spanning 100 RB.

The adjustment of the bandwidth of the broadcast PRS may be based on the number of nearby PRS transmitters, e.g., V-UEs. For example, if there is centralized control of the PRS transmissions, a central server with knowledge of the number of nearby PRS transmitters may be used to assign resources to V-UEs, e.g., based on the number of nearby PRS transmitters. In other implementations where control of the PRS transmissions is decentralized, a V-UE may estimate the number of nearby PRS transmitters and may adjust the PRS transmission accordingly.

For example, in an implementation where the PRS is broadcast in a centralized fashion, e.g., where the PRS is controlled by a central entity, such as a server, RSU, or other vehicle, a vehicle may request an adjustment in the PRS broadcast parameters from the central entity and may receive instructions to adjust the bandwidth of the PRS accordingly. For example, the central entity may be a V2X application server 130, RSU 110, or a separate vehicle 104, shown in FIG. 1. For example, the central entity (e.g., RSU 110 or sidelink vehicle 104) may perform LBT and assign each group member (e.g., including the RSU 110 and/or the sidelink vehicle 104) a time slot and standard broadcast parameters, such as timing and bandwidth, e.g., 100 msec soft periodicity and occupy 50 resource blocks (approximately). When a vehicle requests adjustment of the PRS broadcast parameters, the central entity may assign that vehicle a time slot and increased PRS broadcast parameters, e.g., increased frequency and/or increase bandwidth, such as 50 msec periodicity and/or 100 resource blocks.

In some implementations, the central entity may be aware of the number of vehicles. The spectrum may include a number N of resource blocks that are available to be allocated to V-UEs, and there may be a number K vehicles transmitting PRS scheduled to populate the available N resource blocks at each time. Thus, each vehicle may broadcast PRS using N/K resource blocks. If a vehicle 402 detects, e.g., high speed or large acceleration, the vehicle 402 may request an adjustment in its broadcast PRS from the central entity, e.g., server 130, RSU 110 or other vehicle 104. The central entity may instruct vehicle 402 to increase the resource blocks by m, i.e., vehicle 402 may broadcast PRS using m*N/K resource blocks, where m is greater than 1. The value of m may be a fixed value or may be a function of various factors, such as the number of nearby vehicles, the amount that the speed and/or acceleration exceeds the predetermined threshold, etc. In some implementations, the central entity may instruct other vehicles 402 to make a corresponding decrease in the bandwidth of their PRS, e.g., each of the nearby K vehicles may decrease the bandwidth of their broadcast PRS by M/K. In other implementations, the central entity may reserve resource blocks that can be assigned to a vehicle during a period of detected high speed or large acceleration without decreasing resource blocks transmitted by other vehicles.

In a decentralized implementation, e.g., with single-sided positioning with PRS an unlicensed spectrum, where LBT needs to be enforced, a vehicle may sense nearby communications (frequency and time) and transmit in an available time slot. A vehicle, for example, may have 100 msec soft periodicity and occupy 50 resource blocks (approximately) for nominal PRS transmissions. If the vehicle, however, detects signification motion, such as high speed or large acceleration, the vehicle may adjust the PRS transmissions without first accessing a central entity. For example, during a period of significant motion, e.g., high speed or large accelerations, the vehicle may adjust from the nominal PRS transmissions to increase frequency and/or increase bandwidth, e.g., 50 msec periodicity and/or 100 resource blocks. The adjustment to the PRS transmissions may be by a fixed amount, e.g., twice the frequency and/or twice the bandwidth, or may be a function of various factors, such as the amount that the speed and/or acceleration exceeds the predetermined threshold, etc. Once the high speed or the large acceleration is no longer present, the vehicle may return to the nominal PRS transmissions.

Figure 5:
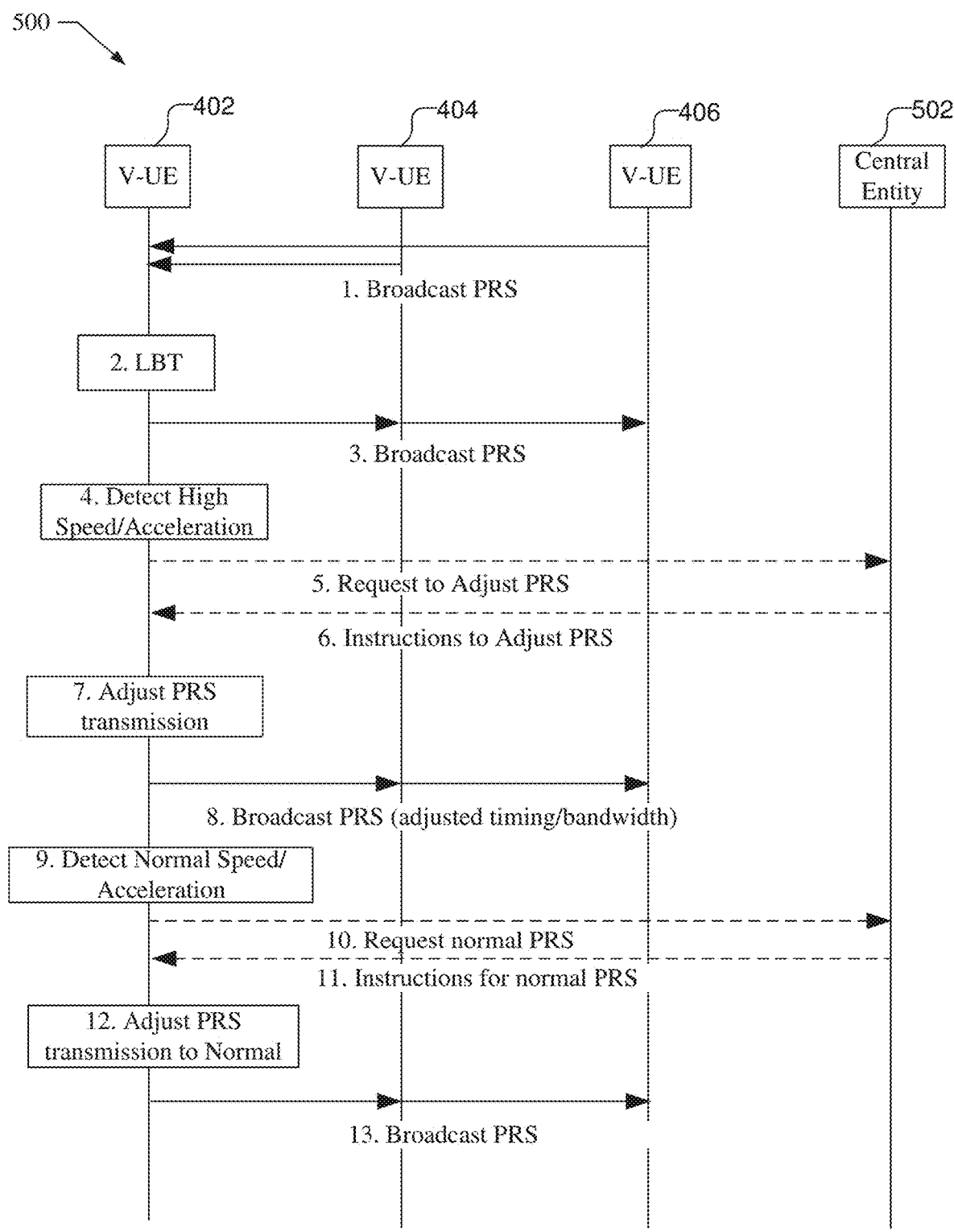
FIG. 5 is a message flow illustrating an example of an inter-vehicle message exchange where broadcast parameters of ranging signals are adjusted based on vehicle motion characteristics.

FIG. 5 is a message flow 500 illustrating an example of an inter-vehicle message exchange for ranging wherein the broadcast parameters of PRS is adjusted based on one or more vehicle motion characteristics. FIG. 5 illustrates a number of V-UE 402, 404, and 406, and a central entity 502, which may be server 130, RSU 110 or another V-UE. It should be understood that additional or fewer V-UEs may be included. Moreover, various types of infrastructure, such as RSU 110 and/or network base stations 122 may be present, e.g., to relay communications between V-UE 402 and central entity 502. Further, it should be understood that additional (or fewer) messages may be transmitted. For example, each V-UE may transmit an ITS message along with (or after) broadcasting PRS, e.g., to provide the time of transmission of the PRS, which may be used by receiving V-UEs to determine the range to the broadcasting V-UE. Additionally, messages may be transmitted by the central entity 502 or other entities, such as a location server, map server, etc., to provide information related to vehicle navigation, geography, road conditions, etc., which may be used to vary thresholds used to determine if vehicle motion, e.g., speed or velocity, is significant.

At stage 1, V-UE 402 receives broadcast PRS from nearby V-UEs 404 and 406. The broadcast PRS may be any type of ranging signal, such as physical ranging signals, positioning ranging signals, positioning reference signals, or physical referencing signals, as discussed above.

At stage 2, the V-UE 402 may perform LBT on the unlicensed spectrum, e.g., if the PRS broadcasts are performed in a decentralized implementation. In implementations where centralized control of PRS is used, e.g., based on instructions from central entity 502, the central entity 502, e.g., an RSU 110 or other V-UE, may perform LBT and assign PRSs timing to members of the group (e.g., V-UE 402, V-UE 404, and V-UE 406) and V-UE 402 need not perform LBT itself and stage 2 may be obviated.

At stage 3, the V-UE 402 may broadcast PRS. The PRS may be broadcast by the V-UE 402 using parameters, e.g., timing and bandwidth, reserved for normal operating conditions, e.g., when no high speed or large acceleration has been detected by V-UE 402. The broadcast parameters, e.g., timing and bandwidth, for example, may be based on predetermined parameters that the V-UE 402 is configured to use during normal operating conditions, i.e., when high speed or acceleration is not detected. The broadcast parameters may have been previously provided to the V-UE 402 from the central entity 502, or may be default parameters stored in V-UE 402.

At stage 4, the V-UE 402 detects significant motion of the vehicle, such as high speed or large acceleration, including acceleration, deceleration, rate of turning, or combination thereof. For example, the V-UE 402 may use the vehicle's speed and/or acceleration sensors or an accelerometer in the V-UE 402 to determine the speed and/or any acceleration, which may be compared to a predetermined threshold. In some implementations, the combination of speed and acceleration, e.g., acceleration normalized for speed, may be used. The predetermined threshold may vary based on external factors, including the speed of the vehicle, geography, or road conditions, which may be known by the V-UE 402 based on vehicle navigation applications, as well as communications from central entity 502.

At stage 5, if centralized control is implemented, the V-UE 402 may transmit a message to the central entity 502 requesting adjustment of the PRS parameters. In some implementations, the message may include information related to the detected one or more motion characteristics, such as the type of motion, the amount of motion, i.e., detected speed and/or acceleration, or by how much a predetermined threshold has been exceeded.

At stage 6, in response to the request in stage 5, the central entity 502 may determine the adjustment to the PRS parameters and forward instructions to V-UE 402 to broadcast PRS with the adjusted broadcast parameters. For example, the central entity 502 may perform LBT and may assign members of the group a time slot and standard broadcast parameters, such as timing and bandwidth, e.g., 100 msec soft periodicity and occupy 50 resource blocks (approximately), if no request for PRS adjustment has been received, but in response to the request in stage 5, assigns an increase in the PRS broadcast parameters, e.g., an increase in frequency and bandwidth, e.g., 50 msec periodicity and/or 100 resource blocks, to V-UE 402. In some implementation, the total PRS transmission duration of all devices may need to be increase, and therefore, in an LBT implementation, the central entity 502 may use the increased or decreased channel occupancy time. For example, LBT is typically implemented to suppress interference and if the channel occupancy time of all members are increased, then the larger channel occupancy time may be used, corresponding to a longer wait time until the leader has the channel. In some implementations, the central entity 502 may be aware of the number of vehicles near V-UE 402 and may assign PRS broadcast parameters based on the number of vehicles. The adjusted parameters may include, for example, adjustments to the timing of the PRS signals, e.g., additional PRS broadcasts or decrease in the period of the PRS broadcasts, and/or the bandwidth of the broadcast PRS, e.g., an increase in resource blocks used in the PRS broadcast. The adjustments may be fixed, e.g., a fixed increase in the rate of PRS broadcasts and resource blocks used, or may be variable on factors such as the number of nearby vehicles and amount that the predetermined threshold was exceeded, etc. In some implementations, e.g. where all or nearly all resource blocks have been previously assigned, the central entity 502 may instruct other V-UEs 404 and/or 406 to adjust their broadcast PRS in a corresponding manner, e.g., by increasing/reducing the number of resource blocks.

At stage 7, V-UE 402 adjusts the scheduled PRS broadcast parameters based on the detected one or more motion characteristics from stage 4 and/or the instructions from the central entity 502 at stage 6 if present. The adjusted parameters may include, for example, adjustments to the timing of the PRS signals, e.g., additional PRS broadcasts or decrease in the period of the PRS broadcasts, and/or the bandwidth of the broadcast PRS, e.g., an increase in resource blocks used in the PRS broadcast. The adjustments may be fixed, e.g., double the rate of PRS broadcasts and double the resource blocks used, or may be variable on factors such as the estimated number of nearby vehicles and amount that the predetermined threshold was exceeded, etc.

At stage 8, the V-UE 402 broadcasts PRS with the adjusted timing and/or bandwidth. In some implementations, the V-UE 402 may perform a LBT before broadcasting as discussed at stage 2. Nearby V-UEs 404 and 406 may receive the broadcast PRS and determine the range to V-UE 402 with an increased update rate and/or with increased accuracy due to the adjusted timing and/or bandwidth.

At stage 9, the V-UE 402 detects normal speed and acceleration, i.e., the detected speed and acceleration no longer exceeds the predetermine threshold.

At stage 10, if centralized control is implemented, the V-UE 402 may transmit a message to the central entity 502 requesting that normal PRS transmissions be resumed.

At stage 11, in response to the request in stage 10, the central entity 502 may determine the adjustment to the PRS parameters to resume normal PRS transmissions and may forward instructions to V-UE 402 to broadcast PRS with the normal parameters. In some implementations, the central entity 502 may instruct other V-UEs 404 and/or 406 to adjust their broadcast PRS in a corresponding manner, e.g., so that V-UEs 404 and 406 broadcast PRS with normal timing and bandwidth parameters.

At stage 12, V-UE 402 adjusts the scheduled PRS broadcast parameters back to normal based on the detected normal one or more motion characteristics from stage 9 and/or the instructions from the central entity 502 at stage 11 if present.

At stage 13, the V-UE 402 broadcasts PRS with the normal broadcast parameters, e.g., timing and/or bandwidth, e.g., the same as used in stage 3. In some implementations, the V-UE 402 may perform a LBT before broadcasting as discussed at stage 2.

Figure 6:
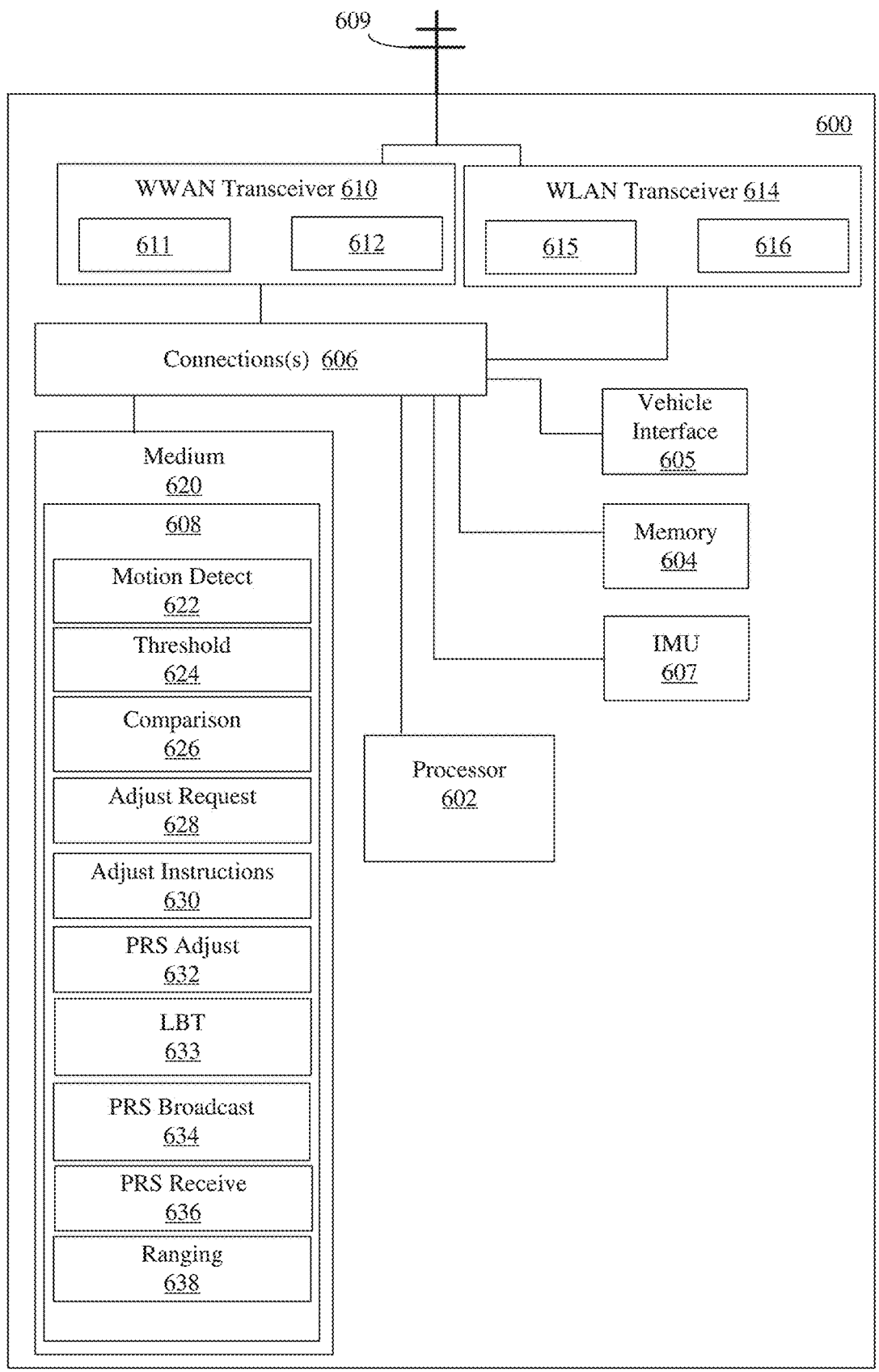
FIG. 6 is a diagram illustrating an example of a hardware implementation of a user equipment (UE) for a vehicle capable adjusting broadcast parameters of ranging signals based on vehicle motion characteristics.

FIG. 6 shows a schematic block diagram illustrating certain exemplary features of a vehicle user equipment (V-UE) 600, which may be UE in a vehicle, such as described in reference to FIGS. 1-6. The V-UE 600 may be configured to control the automated driving of a vehicle 102, including broadcasting PRS for ranging and adjusting the PRS broadcast parameters based on detected one or more motion characteristics. The V-UE 600 may include a vehicle interface 605 with which commands are provided to the vehicle for automated driving and sensory input, including speed and acceleration, may be provided from the vehicle to V-UE 600. The V-UE 600 may, for example, include one or more processors 602, memory 604, an inertial measurement unit (IMU) 607 that may include, e.g., an accelerometer, gyroscope, magnetometers, etc., which may be used to detect the motion or one or more motion characteristics of the vehicle, and an external interface including, e.g., a Wireless Wide Area Network (WWAN) transceiver 610, and a Wireless Local Area Network (WLAN) transceiver 614, which may be operatively coupled with one or more connections 606 (e.g., buses, lines, fibers, links, etc.) to non-transitory computer readable medium 620 and memory 604. The V-UE 600 may further include additional items, which are not shown, such as a user interface that may include e.g., a display, a keypad or other input device, such as virtual keypad on the display, through which a user may interface with the user device, or a satellite positioning system receiver. In certain example implementations, all or part of V-UE 600 may take the form of a chipset, and/or the like. Transceiver 610 may be, e.g., a cellular transceiver, that is configured to transmit and receive inter-vehicle communications in the wireless network, as illustrated in FIG. 1. The transceiver 610 may include a transmitter 611 enabled to transmit one or more signals over one or more types of wireless communication networks and a receiver 612 to receive one or more signals transmitted over the one or more types of wireless communication networks. Transceiver 614 may be, e.g., a short range transceiver, and may be configured to transmit and receive inter-vehicle communications in the wireless network, as illustrated in FIG. 1. The transceiver 614 may include a transmitter 6175 enabled to transmit one or more signals, including PRS, over one or more types of wireless communication networks and a receiver 6716 to receive one or more signals, e.g., including PRS, transmitted over the one or more types of wireless communication networks. The transceivers 610 and 614 enable the V-UE 600 to communicate with transportation entities using D2D communication links, such as DSRC, C-V2X, or 5G NR.

In some embodiments, V-UE 600 may include antenna 609, which may be internal or external. The antenna 609 may be used to transmit and/or receive signals processed by transceiver 610 and/or transceiver 614. In some embodiments, antenna 609 may be coupled to transceiver 610 and/or transceiver 614. In some embodiments, measurements of signals received (transmitted) by V-UE 600 may be performed at the point of connection of the antenna 609 and transceiver 610 and/or transceiver 614. For example, the measurement point of reference for received (transmitted) RF signal measurements may be an input (output) terminal of the receivers 612, 616 (transmitters 611, 615) and an output (input) terminal of the antenna 609. In a V-UE 600 with multiple antennas 609 or antenna arrays, the antenna connector may be viewed as a virtual point representing the aggregate output (input) of multiple antennas.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of V-UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in V-UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in V-UE 600 is merely exemplary, and as such the functionality of the modules and/or data structures may be combined, separated, and/or be structured in different ways depending upon the implementation of the V-UE 600.

The medium 620 and/or memory 604 may include a motion detect module 622 that when implemented by the one or more processors 602 configures the one or more processors 602 to detect a speed and/or acceleration, including deceleration or rate of turning, based on sensory input provided from the vehicle via the vehicle interface 605 and/or IMU 607. The speed, for example, may be determined based on the speed or acceleration signals received from a speed sensor or accelerometer in the vehicle via the vehicle interface 605 and/or from accelerometers in the IMU 607. The acceleration (including deceleration) may be determined based on the change in speed over a time interval, e.g., a speed difference between sensor updates, divided by the sensor update period, or from an acceleration sensor in the vehicle, and/or accelerometers in IMU 607. The rate of turning may be determined based on sensor input from, e.g., gyroscopes and/or magnetometer in the IMU 607.

The medium 620 and/or memory 604 may include a threshold module 624 that when implemented by the one or more processors 602 configures the one or more processors 602 to generate predetermined thresholds for one or more of speed, acceleration, deceleration, or rate of turning. The predetermined threshold may be a fixed threshold or may be variable based on factors, such as the geography, road conditions, or speed. For example, predetermined thresholds and contributions of variables may be stored in a look up table. The external factors, such as geography, road conditions, etc., may be received from one or more servers, e.g., via transceiver 610 or 614.

The medium 620 and/or memory 604 may include a comparison module 626 that when implemented by the one or more processors 602 configures the one or more processors 602 to compare the one or more motion characteristics, e.g., determined speed, acceleration, deceleration, rate of turning, or a combination thereof to the predetermined one or more thresholds, to determine if the motion characteristics exceeds the predetermined threshold.

The medium 620 and/or memory 604 may include an adjust request module 628 that when implemented by the one or more processors 602 configures the one or more processors 602 to transmit a request to a central entity, via transceiver 610 or transceiver 614, to adjust one or more PRS broadcast parameters, such as the timing of transmission, bandwidth, or combination thereof, in response to the detected motion characteristics exceeding the predetermined threshold, or when the detected motion characteristics no longer exceeds the predetermined threshold.

The medium 620 and/or memory 604 may include an adjust instructions module 630 that when implemented by the one or more processors 602 configures the one or more processors 602 to receive instructions from the central entity, via transceiver 610 or transceiver 614, to adjust one or more PRS broadcast parameters, such as the timing of transmission, bandwidth, or combination thereof, and in some implementations, a timing slot assigned by the central entity.

The medium 620 and/or memory 604 may include a PRS adjust module 632 that when implemented by the one or more processors 602 configures the one or more processors 602 to adjust one or more PRS broadcast parameters, such as the timing of transmission, bandwidth, or combination thereof. For example, the rate of transmission and/or the number of resource blocks use in the PRS may be adjusted, e.g., increased when motion characteristics exceeds the predetermined threshold or decreased to predetermined parameters when the motion characteristics no longer exceeds the predetermined threshold. The adjustment of the PRS broadcast parameters may be based on a fixed amount, on a variable amount, or based on instructions received from a central entity.

The medium 620 and/or memory 604 may include an LBT module 634 that when implemented by the one or more processors 602 configures the one or more processors 602 to perform a LBT protocol before broadcasting ranging signals (PRS).

The medium 620 and/or memory 604 may include a PRS broadcast module 634 that when implemented by the one or more processors 602 configures the one or more processors 602 to broadcast a ranging signal (PRS), via transceiver 614 according to the predetermined or adjusted parameters.

The medium 620 and/or memory 604 may include a PRS receive module 636 that when implemented by the one or more processors 602 configures the one or more processors 602 to receive and measure broadcast PRS (or other signals from nearby vehicles) via transceiver 614, as well as associated signals, e.g., ITS messages, to provide the time of transmission of the PRS broadcast. For example, the number of vehicles broadcasting PRS may be measured as well as the received power, e.g., Reference Signal Receive Power (RSRP) from the broadcast PRS may be measured.

The medium 620 and/or memory 604 may include a ranging module 638 that when implemented by the one or more processors 602 configures the one or more processors 602 to determine a range to a broadcasting vehicle, e.g., based on the time of reception and time of transmission of the PRS broadcast.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support adjustment of ranging signals in response to detected one or more motion characteristics in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

Figure 7:
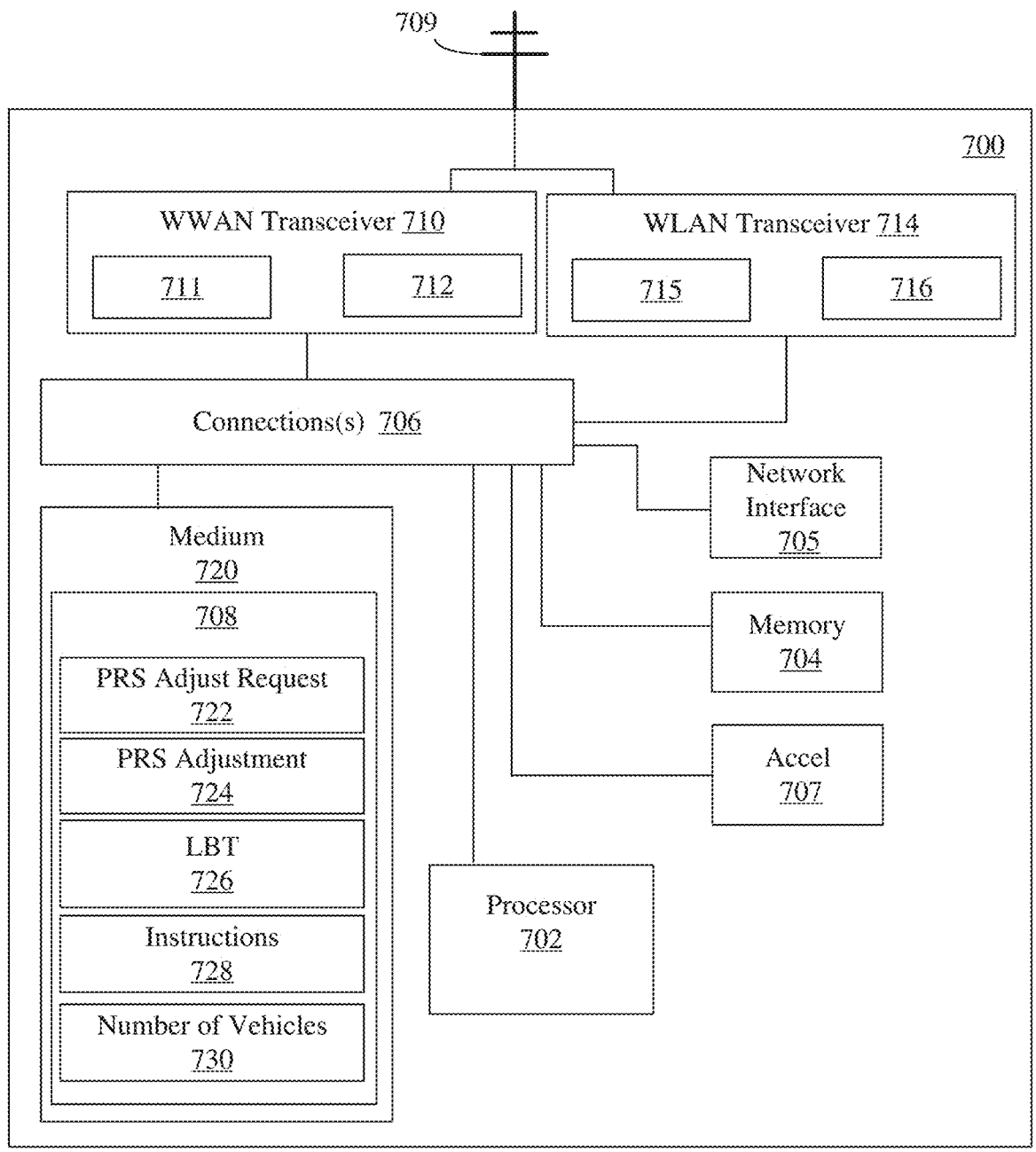
FIG. 7 is a diagram illustrating an example of a hardware implementation of an entity in a wireless communication system that is configured to support ranging between vehicles in the wireless communication system based on vehicle motion characteristics.

FIG. 7 shows a schematic block diagram illustrating certain exemplary features of an entity 700 in a wireless communication system, that may be configured to support ranging between vehicles in the wireless communication system, such as described in reference to FIGS. 1-5 and 7. The entity 700, for example, may be server 130, RSU 110 or sidelink V-UE 104, as shown in FIG. 1. The entity 700 may, for example, include one or more processors 702, memory 704, an accelerometer 707, and an external interface including, e.g., one or more of a Wireless Wide Area Network (WWAN) transceiver 710, and a Wireless Local Area Network (WLAN) transceiver 714, or a network interface 705 (e.g., if entity 700 is a server 130), which may be operatively coupled with one or more connections 706 (e.g., buses, lines, fibers, links, etc.) to non-transitory computer readable medium 720 and memory 704. In certain example implementations, all or part of entity 700 may take the form of a chipset, and/or the like. Transceiver 710 may be, e.g., a cellular transceiver, that is configured to transmit and receive inter-vehicle communications in the wireless network, as illustrated in FIG. 1. The transceiver 710 may include a transmitter 711 enabled to transmit one or more signals over one or more types of wireless communication networks and a receiver 712 to receive one or more signals transmitted over the one or more types of wireless communication networks. Transceiver 714 may be, e.g., a short range transceiver, and may be configured to transmit and receive inter-vehicle communications in the wireless network, as illustrated in FIG. 1. The transceiver 714 may include a transmitter 7175 enabled to transmit one or more signals, including PRS, over one or more types of wireless communication networks and a receiver 7716 to receive one or more signals, e.g., including PRS, transmitted over the one or more types of wireless communication networks. The transceivers 710 and 714 enable the entity 700 to communicate with transportation entities using D2D communication links, such as DSRC, C-V2X, or 5G NR. Network interface 705 may be, e.g., wireline or wireless network interface to other network entities and/or the core network.

In some embodiments, entity 700 may include antenna 709, which may be internal or external. The antenna 709 may be used to transmit and/or receive signals processed by transceiver 710 and/or transceiver 714. In some embodiments, antenna 709 may be coupled to transceiver 710 and/or transceiver 714. In some embodiments, measurements of signals received (transmitted) by entity 700 may be performed at the point of connection of the antenna 709 and transceiver 710 and/or transceiver 714. For example, the measurement point of reference for received (transmitted) RF signal measurements may be an input (output) terminal of the receivers 712, 716 (transmitters 711, 715) and an output (input) terminal of the antenna 709. In an entity 700 with multiple antennas 709 or antenna arrays, the antenna connector may be viewed as a virtual point representing the aggregate output (input) of multiple antennas.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of entity 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in entity 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in entity 700 is merely exemplary, and as such the functionality of the modules and/or data structures may be combined, separated, and/or be structured in different ways depending upon the implementation of the entity 700.

The medium 720 and/or memory 704 may include a PRS adjust request module 722 that when implemented by the one or more processors 702 configures the one or more processors 702 to receive, via an external interface, a request from a device in a vehicle to adjust at least one of timing of transmission, bandwidth, or combination thereof for a ranging signal. The device may transmit the request to entity 700, e.g., based on detected one or more motion characteristics of the vehicle, the one or more motion characteristics comprising at least one of speed, velocity, acceleration, deceleration, and rate of turning or a combination thereof exceeding a threshold. The request may be to increase or decrease the timing and bandwidth of the ranging signals, e.g., the rate of transmissions or the number of resource blocks used in the ranging signal.

The medium 720 and/or memory 704 may include a PRS adjustment module 724 that when implemented by the one or more processors 702 configures the one or more processors 702 to determine an adjustment to the at least one of timing of transmission, bandwidth, or combination thereof for the ranging signal. For example, the determined adjustment may be, e.g., increasing or decreasing a rate of transmissions of the ranging signal or increasing a number of resource blocks used in the ranging signal. The adjustment may be based on a fixed adjustment or a variable adjustment, e.g., based on a number of vehicles from which PRS is broadcast, e.g., near the requesting vehicle.

The medium 720 and/or memory 704 may include an LBT module 726 that when implemented by the one or more processors 702 configures the one or more processors 702 to perform a LBT protocol, via transceiver 714, and assign a transmission slot to the requesting vehicle and other vehicles, e.g., if the entity 700 is a local entity such as an RSU or a sidelink vehicle.

The medium 720 and/or memory 704 may include an instructions module 728 that when implemented by the one or more processors 702 configures the one or more processors 702 to transmit, via an external interface, instructions to adjust to the request device to adjust the at least one of the timing of transmission, bandwidth, or combination thereof for the ranging signal to be broadcast by the device.

The medium 720 and/or memory 704 may include an number of vehicles module 730 that when implemented by the one or more processors 702 configures the one or more processors 702 to monitor the number of vehicles in the vicinity of the requesting vehicle, e.g., based on the number of vehicles in the LBT group.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support adjustment of ranging signals in vehicles in response to detected one or more motion characteristics in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Figure 8:
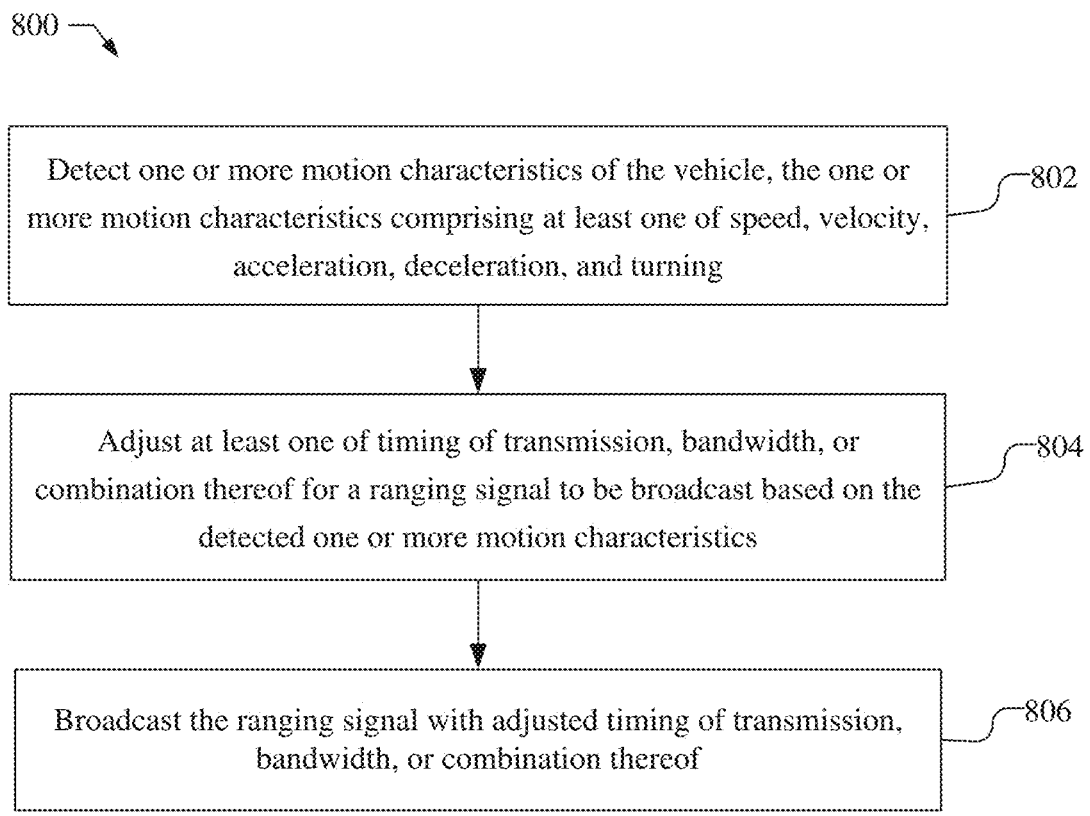
FIG. 8 is a flow chart illustrating ranging between vehicles performed by a device in a vehicle, in which broadcast parameters of ranging signals are adjusted based on vehicle motion characteristics.

FIG. 8 is a flow chart 800 illustrating ranging between vehicles performed by a device in a vehicle, such as V-UE 402 or V-UE 600. At block 802, one or more motion characteristics of the vehicle are detected, the one or more motion characteristics comprising at least one of speed, velocity, acceleration, deceleration, and turning, such as discussed at stage 4 of FIG. 5. A means for detecting one or more motion characteristics of the vehicle, the one or more motion characteristics comprising at least one of speed, velocity, acceleration, deceleration, and turning may be, e.g., the vehicle interface 605, the IMU 607, and the one or more processors 602 with dedicated hardware or implementing executable code or software instructions in memory 604 and/or medium 620 such as the motion detect module 622.

At block 804, at least one of timing of transmission, bandwidth, or combination thereof for a ranging signal to be broadcast is adjusted based on the detected one or more motion characteristics, e.g., as discussed at stages 5, 6, and 7 of FIG. 5. A means for adjusting at least one of timing of transmission, bandwidth, or combination thereof for a ranging signal to be broadcast based on the detected one or more motion characteristics may be, e.g., the one or more processors 602 with dedicated hardware or implementing executable code or software instructions in memory 604 and/or medium 620 such as the PRS adjust module 632.

At block 806, the ranging signal is broadcast with the adjusted timing of transmission, bandwidth, or combination thereof, e.g., as discussed at stage 8 of FIG. 5. A means for broadcasting the ranging signal with adjusted timing of transmission, bandwidth, or combination thereof may be, e.g., the transceiver 614 and the one or more processors 602 with dedicated hardware or implementing executable code or software instructions in memory 604 and/or medium 620 such as the PRS broadcast module 634.

In some implementations, adjusting the at least one of the timing of transmission, bandwidth, or combination thereof may include increasing a rate of transmissions of the ranging signal or increasing a number of resource blocks used in the ranging signal, e.g., as discussed at stage 7 of FIG. 5, which may be performed, e.g., by the one or more processors 602 with dedicated hardware or implementing executable code or software instructions in memory 604 and/or medium 620 such as the PRS adjust module 632.

In some implementations, one or more ranging signals may be broadcast with a predetermined timing of transmission and bandwidth prior to detecting the one or more motion characteristics of the vehicle, e.g., as discussed at stage 3 of FIG. 5. A means for broadcasting one or more ranging signals with a predetermined timing of transmission and bandwidth prior to detecting the one or more motion characteristics of the vehicle may be, e.g., the transceiver 614 and the one or more processors 602 with dedicated hardware or implementing executable code or software instructions in memory 604 and/or medium 620 such as the PRS broadcast module 634. The predetermined timing of transmission and bandwidth may be based on a number of other vehicles from which PRS is broadcast, and adjusting the at least one of the timing of transmission, bandwidth, or combination thereof may be based on the number of other vehicles, e.g., as discussed at stages 3 and 7 of FIG. 5, which may be performed, e.g., by the transceiver 614 and the one or more processors 602 with dedicated hardware or implementing executable code or software instructions in memory 604 and/or medium 620 such as the PRS receive module 634. In one example, a received power over an available frequency spectrum for a duration of time may be determined, and the number of other vehicles from which PRS is broadcast may be determined based on the received power over the available frequency spectrum for the duration of time, e.g., as discussed at stage 2 of FIG. 5, which may be performed, e.g., by the transceiver 614 and the one or more processors 602 with dedicated hardware or implementing executable code or software instructions in memory 604 and/or medium 620 such as the PRS receive module 634.

In some implementations, the one or more motion characteristics of the vehicle may be detected by determining at least one of speed, velocity, acceleration, deceleration, rate of turning, or a combination thereof exceeds a predetermined threshold, e.g., as discussed at stage 4 of FIG. 5. A means for determining the at least one of speed, velocity, acceleration, deceleration, and rate of turning no longer exceeds the predetermined threshold, which may be, e.g., the one or more processors 602 with dedicated hardware or implementing executable code or software instructions in memory 604 and/or medium 620 such as the threshold module 624 and comparison module 626. The predetermined threshold, for example, may be based on at least one of geography, road conditions, and speed of the vehicle, or a combination thereof, e.g., as discussed at stage 4 of FIG. 5, which may be acquired, e.g., by the transceiver 610 or 614 and the one or more processors 602 with dedicated hardware or implementing executable code or software instructions in memory 604 and/or medium 620 such as the threshold module 624.

In one implementation, the at least one of the timing of transmission, bandwidth, or combination thereof may be adjusted by increasing a rate of transmissions of the ranging signal or increasing a number of resource blocks used in the ranging signal. The V-UE may determine when at least one of speed, velocity, acceleration, deceleration, and rate of turning no longer exceeds the predetermined threshold, and the rate of transmissions of the ranging signal or the number of resource blocks used in the ranging signal may be decreased, e.g., as discussed at stages 9-12 of FIG. 5, e.g., as performed by the one or more processors 602 with dedicated hardware or implementing executable code or software instructions in memory 604 and/or medium 620 such as the PRS adjust module 632.

In some implementations, a request to a central entity to adjust the at least one of the timing of transmission, bandwidth, or combination thereof for the ranging signal may be transmitted in response to the detected one or more motion characteristics, e.g., as discussed at stage 5 of FIG. 5. A means for transmitting a request to a central entity to adjust the at least one of the timing of transmission, bandwidth, or combination thereof for the ranging signal in response to the detected one or more motion characteristics may be, e.g., the transceiver 610 or transceiver 614, the one or more processors 602 with dedicated hardware or implementing executable code or software instructions in memory 604 and/or medium 620 such as the adjust request module 628. Instructions may be received from the central entity to adjust the at least one of the timing of transmission, bandwidth, or combination thereof for the ranging signal, e.g., as discussed at stage 6 of FIG. 5. A means for receiving instructions from the central entity to adjust the at least one of the timing of transmission, bandwidth, or combination thereof for the ranging signal may be, e.g., the transceiver 610 or transceiver 614, the one or more processors 602 with dedicated hardware or implementing executable code or software instructions in memory 604 and/or medium 620 such as the adjust instructions module 630. The at least one of the timing of transmission, bandwidth, or combination thereof for the ranging signal may be adjusted is in response to the instructions, e.g., as discussed at stage 7 of FIG. 5.

Figure 9:
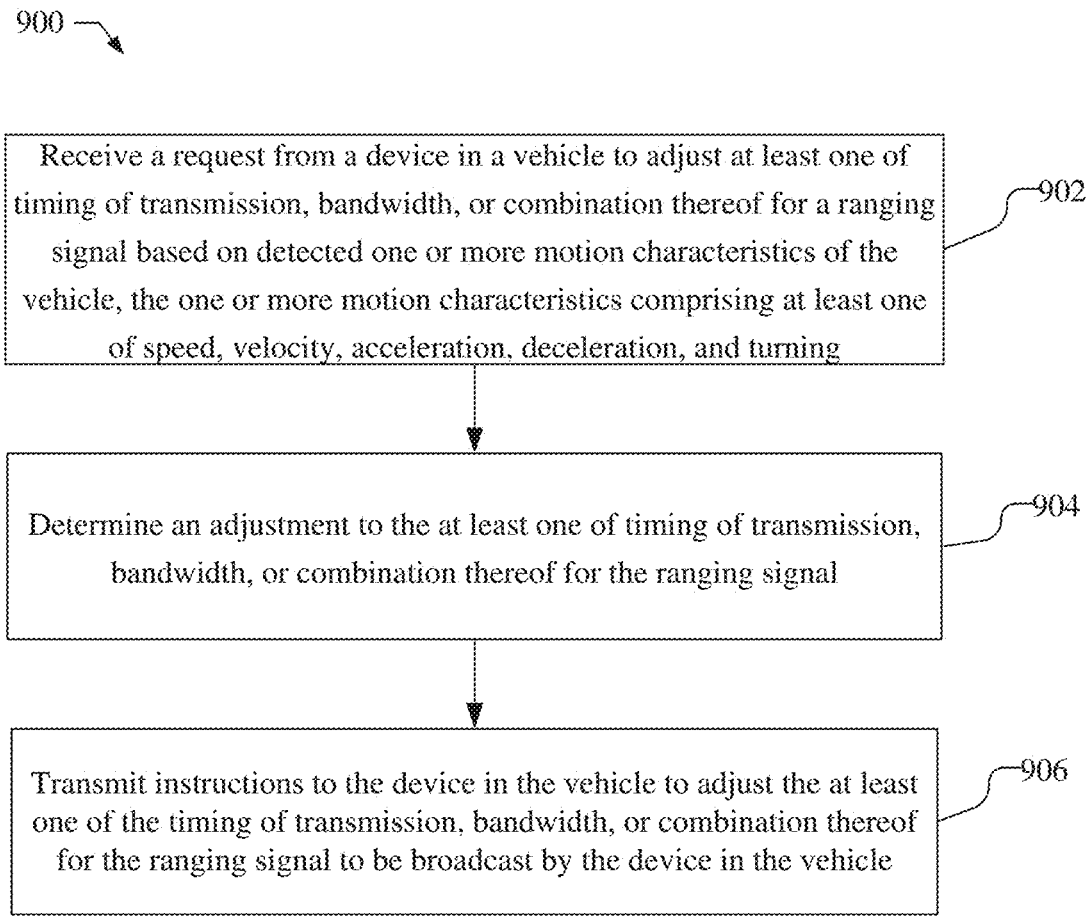
FIG. 9 is a flow chart illustrating ranging between vehicles performed by an entity in a wireless communication system, in which broadcast parameters of ranging signals are adjusted based on vehicle motion characteristics.

FIG. 9 is a flow chart 900 illustrating ranging between vehicles performed by an entity in a wireless communication system, such as entity 700, which may be a server 130, RSU 110 or another V-UE. At block 902, a request is received from a device in a vehicle to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning, e.g., as discussed at stages 4 and 5 of FIG. 5. A means for receiving a request from a device in a vehicle to adjust at least one of timing of transmission, bandwidth, or combination thereof for a ranging signal based on detected one or more motion characteristics of the vehicle, the one or more motion characteristics comprising at least one of speed, velocity, acceleration, deceleration, and turning may be, e.g., the external interface, e.g., one of transceiver 710, transceiver 714, or network interface 705, and the one or more processors 702 with dedicated hardware or implementing executable code or software instructions in memory 704 and/or medium 720 such as the PRS adjust request module 722.

At block 904, the entity may determine an adjustment to the at least one of timing of transmission, bandwidth, or combination thereof for the ranging signal, e.g., as discussed at stage 6 of FIG. 5. A means for determining an adjustment to the at least one of timing of transmission, bandwidth, or combination thereof for the ranging signal may be, e.g., the one or more processors 702 with dedicated hardware or implementing executable code or software instructions in memory 704 and/or medium 720 such as the PRS adjustment module 724.

At block 906, instructions are transmitted to the device in the vehicle to adjust the at least one of the timing of transmission, bandwidth, or combination thereof for the ranging signal to be broadcast by the device in the vehicle, e.g., as discussed at stage 6 of FIG. 5. A means for transmitting instructions to the device in the vehicle to adjust the at least one of the timing of transmission, bandwidth, or combination thereof for the ranging signal to be broadcast by the device in the vehicle may be, e.g., the external interface, e.g., one of transceiver 710, transceiver 714, or network interface 705, and the one or more processors 702 with dedicated hardware or implementing executable code or software instructions in memory 704 and/or medium 720 such as the instructions module 728.

In one implementation, the entity may determine the adjustment to the at least one of the timing of transmission, bandwidth, or combination thereof by increasing a rate of transmissions of the ranging signal or increasing a number of resource blocks used in the ranging signal, e.g., as discussed at stage 6 of FIG. 5, which may be performed by the one or more processors 702 with dedicated hardware or implementing executable code or software instructions in memory 704 and/or medium 720 such as the PRS adjustment module 724.

In one implementation, the entity may perform a Listen-Before-Transmission protocol and assign a transmission slot to the device in the vehicle to broadcast the ranging signals, e.g., as discussed at stage 6 of FIG. 5. A means for performing a Listen-Before-Transmission protocol and assigning a transmission slot to the device in the vehicle to broadcast the ranging signals may be, e.g., the external interface, e.g., transceiver 714, and the one or more processors 702 with dedicated hardware or implementing executable code or software instructions in memory 704 and/or medium 720 such as the LBT module 726.

In one implementation, the entity may determine the adjustment to the at least one of timing of transmission, bandwidth, or combination thereof for the ranging signal using a fixed adjustment to the at least one of timing of transmission, bandwidth, or combination thereof for the ranging signal, e.g., as discussed at stage 6 of FIG. 5, which may be performed by the one or more processors 702 with dedicated hardware or implementing executable code or software instructions in memory 704 and/or medium 720 such as the PRS adjustment module 724.

In one implementation, the entity may determine the adjustment to the at least one of timing of transmission, bandwidth, or combination thereof for the ranging signal comprises using a variable adjustment to the at least one of timing of transmission, bandwidth, or combination thereof for the ranging signal based on a number of other vehicles from which PRS is broadcast, e.g., as discussed at stage 6 of FIG. 5, which may be performed by the one or more processors 702 with dedicated hardware or implementing executable code or software instructions in memory 704 and/or medium 720 such as the PRS adjustment module 724.

In one implementation, the detected one or more motion characteristics of the vehicle may be based on the at least one of speed, velocity, acceleration, deceleration, rate of turning, or combination thereof exceeding a predetermined threshold, e.g., as discussed at stage 4 of FIG. 5. In some implementations, the entity may adjust the at least one of the timing of transmission, bandwidth, or combination thereof comprises increasing a rate of transmissions of the ranging signal or increasing a number of resource blocks used in the ranging signal, and the entity may further receive a second request from the device in the vehicle to adjust the at least one of timing of transmission, bandwidth, or combination thereof for the ranging signal based on the at least one of speed, velocity, acceleration, deceleration, rate of turning, or combination thereof no longer exceeding the predetermined threshold, e.g., as discussed at stage 10 of FIG. 5. A means for receiving a second request from the device in the vehicle to adjust the at least one of timing of transmission, bandwidth, or combination thereof for the ranging signal based on the at least one of speed, velocity, acceleration, deceleration, rate of turning, or combination thereof no longer exceeding the predetermined threshold may be, e.g., the external interface, e.g., one of transceiver 710, transceiver 714, or network interface 705, and the one or more processors 702 with dedicated hardware or implementing executable code or software instructions in memory 704 and/or medium 720 such as the PRS adjust request module 722. The entity may determine a second adjustment to the at least one of timing of transmission, bandwidth, or combination thereof for the ranging signal, e.g., as discussed at stage 11 of FIG. 5. A means for determining a second adjustment to the at least one of timing of transmission, bandwidth, or combination thereof for the ranging signal may be, e.g., the one or more processors 702 with dedicated hardware or implementing executable code or software instructions in memory 704 and/or medium 720 such as the PRS adjustment module 724. Second instructions may be transmitted to the device in the vehicle to decrease the rate of transmissions of the ranging signal or decreasing the number of resource blocks used in the ranging signal, e.g., as discussed at stage 11 of FIG. 5. A means for transmitting second instructions to the device in the vehicle to decrease the rate of transmissions of the ranging signal or decreasing the number of resource blocks used in the ranging signal may be, e.g., the external interface, e.g., one of transceiver 710, transceiver 714, or network interface 705, and the one or more processors 702 with dedicated hardware or implementing executable code or software instructions in memory 704 and/or medium 720 such as the instructions module 728.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between vehicles performed by a device in a vehicle, the method comprising:
   detecting one or more motion characteristics of the vehicle, the one or more motion characteristics comprising at least one of speed, velocity, acceleration, deceleration, turning, or combinations thereof;
   adjusting at least one of timing of transmission, bandwidth, or combination thereof for a ranging signal to be broadcast based on the detected one or more motion characteristics and a number of other vehicles from which reference signals are broadcast, wherein the ranging signal comprises a positioning reference signal (PRS); and
   broadcasting the ranging signal with adjusted timing of transmission, bandwidth, or combination thereof.

2. The method of claim 1, wherein adjusting the at least one of the timing of transmission, bandwidth, or combination thereof comprises increasing a rate of transmissions of the ranging signal or increasing a number of resource blocks used in the ranging signal.

3. The method of claim 1, further comprising:
   broadcasting one or more ranging signals with a predetermined timing of transmission and bandwidth prior to detecting the one or more motion characteristics of the vehicle.

4. The method of claim 1, wherein detecting the one or more motion characteristics of the vehicle comprises determining that at least one of speed, velocity, acceleration, deceleration, rate of turning, or combination thereof exceeds a predetermined threshold.

5. The method of claim 4, wherein the predetermined threshold is based on at least one of geography, road conditions, and speed of the vehicle, or a combination thereof.

6. The method of claim 4, wherein adjusting the at least one of the timing of transmission, bandwidth, or combination thereof comprises increasing a rate of transmissions of the ranging signal or increasing a number of resource blocks used in the ranging signal, the method further comprising:
  determining that the at least one of speed, velocity, acceleration, deceleration, and rate of turning no longer exceeds the predetermined threshold; and
  decreasing the rate of transmissions of the ranging signal or decreasing the number of resource blocks used in the ranging signal.

7. The method of claim 1, further comprising:
  transmitting a request to a central entity to adjust the at least one of the timing of transmission, bandwidth, or combination thereof for the ranging signal in response to the detected one or more motion characteristics;
  receiving instructions from the central entity to adjust the at least one of the timing of transmission, bandwidth, or combination thereof for the ranging signal;
  wherein adjusting the at least one of the timing of transmission, bandwidth, or combination thereof for the ranging signal is in response to the instructions.

8. A wireless device in a vehicle configured to support ranging between vehicles, comprising:
  at least one wireless transceiver configured to communicate in a wireless communication system;
  at least one memory;
  at least one processor coupled to the at least one wireless transceiver and the at least one memory, wherein the at least one processor is configured to:
    detect one or more motion characteristics of the vehicle, the one or more motion characteristics comprising at least one of speed, velocity, acceleration, deceleration, turning, or combinations thereof;
    adjust at least one of timing of transmission, bandwidth, or combination thereof for a ranging signal to be broadcast based on the detected one or more motion characteristics and a number of other vehicles from which references signals are broadcast, wherein the ranging signal comprises a positioning reference signal (PRS); and
    broadcast the ranging signal, via the at least one wireless transceiver, with adjusted timing of transmission, bandwidth, or combination thereof.

9. The wireless device of claim 8, wherein the at least one processor is configured to adjust the at least one of the timing of transmission, bandwidth, or combination thereof by being configured to increase a rate of transmissions of the ranging signal or increase a number of resource blocks used in the ranging signal.

10. The wireless device of claim 8, wherein the at least one processor is configured to:
  broadcast one or more ranging signals with a predetermined timing of transmission and bandwidth prior to detecting the one or more motion characteristics of the vehicle.

11. The wireless device of claim 8, wherein the at least one processor is configured to detect the one or more motion characteristics of the vehicle by being configured to determine that at least one of speed, velocity, acceleration, deceleration, rate of turning, or combination thereof exceeds a predetermined threshold.

12. The wireless device of claim 11, wherein the predetermined threshold is based on at least one of geography, road conditions, and speed of the vehicle, or a combination thereof.

13. The wireless device of claim 11, wherein the at least one processor is configured to adjust the at least one of the timing of transmission, bandwidth, or combination thereof by being configured to increase a rate of transmissions of the ranging signal or increasing a number of resource blocks used in the ranging signal, and wherein the at least one processor is further configured to:
  determine that the at least one of speed, velocity, acceleration, deceleration, and rate of turning no longer exceeds the predetermined threshold; and
  decrease the rate of transmissions of the ranging signal or decrease the number of resource blocks used in the ranging signal.

14. The wireless device of claim 8, wherein the at least one processor is further configured to:
  transmit a request to a central entity to adjust the at least one of the timing of transmission, bandwidth, or combination thereof for the ranging signal in response to the detected one or more motion characteristics;
  receive instructions from the central entity to adjust the at least one of the timing of transmission, bandwidth, or combination thereof for the ranging signal;
  wherein the at least one processor is configured to adjust the at least one of the timing of transmission, bandwidth, or combination thereof for the ranging signal in response to the instructions.

15. A method of ranging between vehicles performed by an entity in a wireless communication system, the method comprising:
  receiving a request from a device in a vehicle to adjust at least one of timing of transmission, bandwidth, or combination thereof for a ranging signal based on detected one or more motion characteristics of the vehicle and a number of vehicles from which reference signals are broadcast, the one or more motion characteristics comprising at least one of speed, velocity, acceleration, deceleration, turning, or combinations thereof, wherein the ranging signal comprises a positioning reference signal (PRS);
  determining an adjustment to the at least one of timing of transmission, bandwidth, or combination thereof for the ranging signal; and
  transmitting instructions to the device in the vehicle to adjust the at least one of the timing of transmission, bandwidth, or combination thereof for the ranging signal to be broadcast by the device in the vehicle.

16. The method of claim 15, wherein determining the adjustment to the at least one of the timing of transmission, bandwidth, or combination thereof comprises increasing a rate of transmissions of the ranging signal or increasing a number of resource blocks used in the ranging signal.

17. The method of claim 15, further comprising:
  performing a Listen-Before-Transmission protocol and assigning a transmission slot to the device in the vehicle to broadcast the ranging signals.

18. The method of claim 15, wherein determining the adjustment to the at least one of timing of transmission, bandwidth, or combination thereof for the ranging signal comprises using a fixed adjustment to the at least one of timing of transmission, bandwidth, or combination thereof for the ranging signal.

19. The method of claim 15, wherein the detected one or more motion characteristics of the vehicle is based on the at least one of speed, velocity, acceleration, deceleration, rate of turning, or combination thereof exceeding a predetermined threshold.

20. The method of claim 19, wherein adjusting the at least one of the timing of transmission, bandwidth, or combination thereof comprises increasing a rate of transmissions of the ranging signal or increasing a number of resource blocks used in the ranging signal, the method further comprising:
receiving a second request from the device in the vehicle to adjust the at least one of timing of transmission, bandwidth, or combination thereof for the ranging signal based on the at least one of speed, velocity, acceleration, deceleration, rate of turning, or combination thereof no longer exceeding the predetermined threshold;
determining a second adjustment to the at least one of timing of transmission, bandwidth, or combination thereof for the ranging signal; and
transmitting second instructions to the device in the vehicle to decrease the rate of transmissions of the ranging signal or decrease the number of resource blocks used in the ranging signal.

21. An entity in a wireless communication system configured to support ranging between vehicles in the wireless communication system, comprising:
an external interface configured to communicate in the wireless communication system;
at least one memory;
at least one processor coupled to the external interface and the at least one memory, wherein the at least one processor is configured to:
receive a request from a device in a vehicle, via the external interface, to adjust at least one of timing of transmission, bandwidth, or combination thereof for a ranging signal based on detected one or more motion characteristics of the vehicle and a number of other vehicles from which reference signals are broadcast, the one or more motion characteristics comprising at least one of speed, velocity, acceleration, deceleration, turning, or combinations thereof, wherein the ranging signal comprises a positioning reference signal (PRS);
determine an adjustment to the at least one of timing of transmission, bandwidth, or combination thereof for the ranging signal; and
transmit instructions to the device in the vehicle, via the external interface, to adjust the at least one of the timing of transmission, bandwidth, or combination thereof for the ranging signal to be broadcast by the device in the vehicle.

22. The entity of claim 21, wherein the at least one processor is configured to determine the adjustment to the at least one of the timing of transmission, bandwidth, or combination thereof by being configured to increase a rate of transmissions of the ranging signal or increase a number of resource blocks used in the ranging signal.

23. The entity of claim 21, wherein the at least one processor is configured to:
perform a Listen-Before-Transmission protocol and assign a transmission slot to the device in the vehicle to broadcast the ranging signals.

24. The entity of claim 21, wherein the at least one processor is configured to determine the adjustment to the at least one of timing of transmission, bandwidth, or combination thereof for the ranging signal by being configured to use a fixed adjustment to the at least one of timing of transmission, bandwidth, or combination thereof for the ranging signal.

25. The entity of claim 21, wherein the detected one or more motion characteristics of the vehicle is based on the at least one of speed, velocity, acceleration, deceleration, rate of turning, or combination thereof exceeding a predetermined threshold.

26. The entity of claim 25, wherein the at least one processor is configured to adjust the at least one of the timing of transmission, bandwidth, or combination thereof by being configured to increase a rate of transmissions of the ranging signal or increase a number of resource blocks used in the ranging signal, wherein the at least one processor is further configured to:
receive a second request from the device in the vehicle to adjust the at least one of timing of transmission, bandwidth, or combination thereof for the ranging signal based on the at least one of speed, velocity, acceleration, deceleration, rate of turning, or combination thereof no longer exceeding the predetermined threshold;
determine a second adjustment to the at least one of timing of transmission, bandwidth, or combination thereof for the ranging signal; and
transmit second instructions to the device in the vehicle to decrease the rate of transmissions of the ranging signal or decrease the number of resource blocks used in the ranging signal.

27. A method of ranging between vehicles performed by a device in a vehicle, the method comprising:
broadcasting one or more ranging signals with a predetermined timing of transmission and bandwidth, wherein the predetermined timing of transmission and bandwidth is based on a number of other vehicles from which references signals are broadcast;
detecting one or more motion characteristics of the vehicle, the one or more motion characteristics comprising at least one of speed, velocity, acceleration, deceleration, turning, or combinations thereof;
adjusting at least one of timing of transmission, bandwidth, or combination thereof for a ranging signal to be broadcast based on the detected one or more motion characteristics and the number of other vehicles from which reference signals are broadcast, wherein the ranging signal comprises a positioning reference signal (PRS); and
broadcasting the ranging signal with adjusted timing of transmission, bandwidth, or combination thereof.

28. A wireless device in a vehicle configured to support ranging between vehicles, comprising:
at least one wireless transceiver configured to communicate in a wireless communication system;
at least one memory;
at least one processor coupled to the at least one wireless transceiver and the at least one memory, wherein the at least one processor is configured to:
broadcast one or more ranging signals with a predetermined timing of transmission and bandwidth, wherein the predetermined timing of transmission and bandwidth is based on a number of other vehicles from which references signals are broadcast;

detect one or more motion characteristics of the vehicle, the one or more motion characteristics comprising at least one of speed, velocity, acceleration, deceleration, turning, or combinations thereof;

adjust at least one of timing of transmission, bandwidth, or combination thereof for a ranging signal to be broadcast based on the detected one or more motion characteristics and the number of other vehicles from which references signals are broadcast, wherein the ranging signal comprises a positioning reference signal (PRS); and broadcast the ranging signal, via the at least one wireless transceiver, with adjusted timing of transmission, bandwidth, or combination thereof.

* * * * *